(12) United States Patent
Shao et al.

(10) Patent No.: US 11,269,349 B2
(45) Date of Patent: Mar. 8, 2022

(54) AUTOMATIC WORKING SYSTEM AND CONTROL METHOD THEREOF

(71) Applicant: Positec Power Tools (Suzhou) Co., Ltd., Suzhou (CN)

(72) Inventors: Yong Shao, Suzhou (CN); Chang Zhou, Suzhou (CN); Fangshi Liu, Suzhou (CN)

(73) Assignee: Positec Power Tools (Suzhou) Co., Ltd, Jiangsu (CN)

( * ) Notice: Subject to any disclaimer, the term of this patent is extended or adjusted under 35 U.S.C. 154(b) by 231 days.

(21) Appl. No.: 16/409,267

(22) Filed: May 10, 2019

(65) Prior Publication Data

US 2019/0265725 A1     Aug. 29, 2019

Related U.S. Application Data

(63) Continuation of application No. PCT/CN2017/110743, filed on Nov. 13, 2017.

(30) Foreign Application Priority Data

Nov. 11, 2016  (CN) .......................... 201610997071.2
Nov. 11, 2016  (CN) .......................... 201611040581.7

(51) Int. Cl.
*G05D 1/02*     (2020.01)
*G05D 1/00*     (2006.01)

(52) U.S. Cl.
CPC ......... *G05D 1/0274* (2013.01); *G05D 1/0088* (2013.01); *G05D 1/0278* (2013.01);
(Continued)

(58) Field of Classification Search
CPC combination set(s) only.
See application file for complete search history.

(56) References Cited

U.S. PATENT DOCUMENTS 10,188,029 B1 *  1/2019  Brown ................. A01D 34/008
2005/0007057 A1  1/2005  Peless et al.
(Continued)

FOREIGN PATENT DOCUMENTS

CN     101091428 A     12/2007
CN     104252176 A     12/2014
(Continued)

OTHER PUBLICATIONS

State Intellectual Property Office of the P.R. China, International Search Report and Written Opinion for PCT/CN2017/110743 dated Feb. 7, 2018.

*Primary Examiner* — Thomas G Black
*Assistant Examiner* — Anthony M Gartrelle
(74) *Attorney, Agent, or Firm* — Dentons US LLP

(57) ABSTRACT

The present invention relates to an automatic working system, including a self-moving device and a positioning device. The self-moving device includes a movement module, a task execution module. The positioning device is configured to detect a current position of the self-moving device. The automatic working system includes: a storage unit, configured to store a working area map, and: a map confirmation procedure, which including: providing a drive circuit instruction to move along a working area boundary, and receiving a confirmation signal from a user to complete the map confirmation procedure; and a working procedure including providing a drive circuit instruction to move within a working area defined by the map and execute the working task; and a control module, configured to monitor an output of the positioning device to execute the map confirmation procedure and execute the working procedure after the map confirmation procedure is completed.

20 Claims, 11 Drawing Sheets

(52) U.S. Cl.
CPC .............. *G05D 2201/0201* (2013.01); *G05D 2201/0208* (2013.01)

(56) References Cited

U.S. PATENT DOCUMENTS

| | | | | |
|---|---|---|---|---|
| 2016/0165795 A1* | 6/2016 | Balutis | .................. | A01D 34/008 |
| 2016/0338262 A1* | 11/2016 | Liu | ..................... | A01D 34/003 |
| 2017/0322562 A1* | 11/2017 | Churavy | .............. | G05D 1/0276 |
| 2017/0364088 A1* | 12/2017 | Grufman | | |
| 2018/0077860 A1* | 3/2018 | Einecke | ............... | A01D 34/008 |
| 2018/0370376 A1* | 12/2018 | Liu | ..................... | B60L 11/1829 |
| 2019/0304211 A1* | 10/2019 | Shimamura | ............ | G07C 5/008 |

FOREIGN PATENT DOCUMENTS

| | | |
|---|---|---|
| CN | 106054898 | 10/2016 |
| CN | 106489103 A | 3/2017 |
| DE | 102015222414 A1 | 5/2017 |

\* cited by examiner

AUTOMATIC WORKING SYSTEM AND CONTROL METHOD THEREOF

BACKGROUND

Technical Field

The present invention relates to an automatic working system and a control method thereof, and in particular, to an automatic lawn mower system that does not require arrangement of a boundary line and a control method of the automatic lawn mower system.

Related Art

In an automatic working system, a self-moving device can automatically travel and work within a particular area to complete a specific task. The automatic working system works without manual operation, and some safety problems may occur during the running of the self-moving device. For example, the self-moving device may travel into an unexpected area of a user. An automatic lawn mower is used as an example. The automatic lawn mower may travel into an area outside a lawn or travel into a pit area.

An automatic working system to which an automatic lawn mower belongs is used as an example. In a method for resolving the foregoing problem, a sensor is mounted on an automatic lawn mower to detect a boundary or an obstacle. In this method, a user needs to arrange a boundary line on a lawn. An electrical signal is transmitted in the boundary line to generate an electromagnetic field. A boundary sensor on the automatic lawn mower detects the electromagnetic field. A controller of the automatic lawn mower determines, according to the electromagnetic field detected by the boundary sensor, whether the automatic lawn mower is working within a working area defined by the boundary line. In this method, it is not easy to arrange a boundary line, and a boundary line compromises the look of a lawn.

In another method, a working area map is created to control an automatic lawn mower to move within a working area defined by the map. In one of those map creation methods that can be used, a coordinate system is created to record the position coordinates of a working area, and the recorded position coordinates within the working area is used to define a safe working area for the automatic lawn mower. During working, the controller of the automatic lawn mower determines a relationship between a current position of the automatic lawn mower and the position coordinates within the working area stored in the controller. If it is found that the automatic lawn mower is about to travel to a position outside the safe working area, the automatic lawn mower is controlled to steer towards the working area, to ensure safe working of the automatic lawn mower.

Certainly, in a map creation method, images of a working area may be collected to create an image library, and a position inside the working area, a position outside the working area, a boundary, and the like are defined for images that include different features. During working of the automatic working system, a camera mounted on the automatic lawn mower captures an image of the ground in front of the automatic lawn mower. The controller analyzes an image feature to determine whether the automatic lawn mower is located in a safe working area.

It is not necessary to arrange a boundary line on a lawn in a map creation method, thereby saving a user the trouble of arranging a boundary line. However, the accuracy of a created map is a bottleneck in this method.

For example, the position coordinates of a working area recorded on a map are offset from position coordinates of an actual working area. The safe working area indicated by the map is larger than an actual safe working area of the automatic lawn mower. As a result, during working of the automatic working system, the automatic lawn mower travels to unsafe working area and a safety problem occurs. For another example, the safe working area indicated by the map may be smaller than the actual safe working area of the automatic lawn mower, during working of the automatic working system, the automatic lawn mower may fail to reach an area that is not included in the safe working area defined by the map, and as a result a part of a lawn is left uncut.

In such a map creation method, a created map may still be inaccurate even if a high-precision positioning device is used. Moreover, when a positioning device having higher positioning precision is used, the automatic working system correspondingly has higher costs. It is impossible to keep improving the precision of a positioning device. Therefore, it is urgent to work out a method that can be used to create an accurate map.

SUMMARY

To create an accurate map for a working area map of an automatic working system, the technical solution used in the present invention is as follows:

An automatic working system, comprising a self-moving device and a positioning device, wherein the self-moving device comprises a movement module, a task execution module, and a drive circuit connected to the movement module and the task execution module, and the drive circuit drives the movement module to enable the self-moving device to move, and drives the task execution module to execute a working task; the positioning device is configured to detect a current position of the self-moving device; and the automatic working system comprises: a storage unit, configured to store a working area map, and: a map confirmation procedure, the map confirmation procedure comprising: providing a drive circuit instruction to move along a working area boundary, and receiving a confirmation signal from a user to complete the map confirmation procedure; and a working procedure comprising providing a drive circuit instruction to move within a working area defined by the map and execute the working task; and a control module, configured to monitor an output of the positioning device to execute the map confirmation procedure and execute the working procedure after the map confirmation procedure is completed.

In one embodiment, the positioning device comprises a satellite positioning device.

In one embodiment, the satellite positioning device comprises a differential satellite positioning device.

In one embodiment, the differential satellite positioning device comprises a real-time kinematic (RTK)-Global Positioning System (GPS) positioning device.

In one embodiment, the positioning device is fixedly connected to the self-moving device, or the positioning device is detachably connected to the self-moving device.

In one embodiment, the map confirmation procedure further comprises providing a drive circuit instruction to keep the task execution module from executing the working task.

In one embodiment, the task execution module comprises a cutting assembly, and the map confirmation procedure comprises providing a drive circuit instruction to keep the cutting assembly from executing cutting work.

In one embodiment, the map confirmation procedure further comprises: after the drive circuit instruction is provided to move along the working area boundary, providing a drive circuit instruction to move within a working area defined by the boundary.

In one embodiment, the automatic working system comprises an alarm unit, configured to output an alarm signal indicating a working area exception.

In one embodiment, the automatic working system comprises an environmental sensor, at least partially mounted at the self-moving device, and configured to detect the working area exception when the self-moving device moves within the working area; and the control module monitors an output of the environmental sensor and control the alarm unit to output the alarm signal.

In one embodiment, the map confirmation procedure further comprises: receiving a control signal from the user, and providing a drive circuit instruction according to the control signal to control a movement manner.

In one embodiment, the control signal comprises a movement stop signal, the map confirmation procedure comprises: receiving the movement stop signal from the user, and providing a drive circuit instruction according to the movement stop signal to control to stop moving.

In one embodiment, the map confirmation procedure further comprises receiving a map modification signal from the user to modify the working area map.

In one embodiment, the automatic working system comprising a communications module, communicating with a smart terminal of the user, and configured to receive the confirmation signal from the user.

A control method of an automatic working system, the automatic working system comprising a self-moving device and a positioning device, wherein the self-moving device comprises a movement module and a task execution module; the positioning device is configured to detect a current position of the self-moving device; and the control method comprises the following steps: storing a working area map; controlling to enter a map confirmation mode, and in the map confirmation mode: monitoring the current position of the self-moving device, controlling the movement module based on the working area map to enable the self-moving device to move along a working area boundary; and receiving a confirmation signal from a user; and only after the confirmation signal from the user is received, controlling to enter a working mode; and in the working mode, monitoring the current position of the self-moving device, controlling the movement module to enable the self-moving device to move within a working area defined by the map, and controlling the task execution module to execute a working task.

In one embodiment, the positioning device comprises a satellite positioning device.

In one embodiment, the satellite positioning device comprises a differential satellite positioning device.

In one embodiment, the differential satellite positioning device comprises a real-time kinematic (RTK)-Global Positioning System (GPS) positioning device.

In one embodiment, the positioning device is fixedly connected to the self-moving device, or the positioning device is detachably connected to the self-moving device.

In one embodiment, in the map confirmation mode, the task execution module is controlled not to execute the working task.

In one embodiment, the task execution module comprises a cutting assembly, and in the map confirmation mode, the cutting assembly is controlled not to execute cutting work.

In one embodiment, in the map confirmation mode, after the movement module is controlled based on the working area map to enable the self-moving device to move along a working area boundary, the control method further comprises the following step: controlling the movement module to enable the self-moving device to move within a working area defined by the boundary.

In one embodiment, an alarm unit is provided, and the alarm unit outputs an alarm signal indicating a working area exception.

In one embodiment, an environmental sensor is provided, and the environmental sensor is at least partially mounted at the self-moving device, and detects the working area exception when the self-moving device moves within the working area; and an output of the environmental sensor is monitored to control the alarm unit to output the alarm signal.

In one embodiment, in the map confirmation mode, a control signal from the user is received, and the movement module is controlled according to the control signal to enable the self-moving device to change a movement manner.

In one embodiment, the control signal comprises a movement stop signal, and the movement module is controlled according to the movement stop signal to enable the self-moving device to stop moving.

In one embodiment, in the map confirmation mode, a map modification signal from the user is received, and the working area map is modified according to the map modification signal.

In one embodiment, a communications module is provided, and the communications module communicates with a smart terminal of the user, and is configured to receive the confirmation signal from the user.

An automatic working system includes: a self-moving device, the self-moving device including a movement module, a task execution module, and a control module, where the movement module enables the self-moving device to move; the task execution module executes a working task; the control module is electrically connected to the movement module and the task execution module; the control module includes a storage unit, storing a working area map; the control module controls the self-moving device to move within a working area defined by the map; the automatic working system includes a manual observation mode, and in the manual observation mode, the automatic working system works under the observation of a user; after the storage unit stores the map, and before the control module controls the task execution module to execute the working task, the control module controls the movement module to enable the self-moving device to move to examine the map; and when the control module controls the movement module to enable the self-moving device to move to examine the map, the automatic working system works in the manual observation mode.

In one embodiment, when the control module controls the movement module to enable the self-moving device to move to examine the map, the movement module is controlled to enable the self-moving device to move along a boundary recorded on the map.

In one embodiment, when the control module controls the movement module to enable the self-moving device to move to examine the map, the movement module is controlled to enable the self-moving device to move to cover the working area defined by the map.

In one embodiment, when the control module controls the movement module to enable the self-moving device to move to examine the map, the control module controls the task execution module to keep a nonworking state.

In one embodiment, the control module modifies the map stored in the storage unit based on an observation result of the user.

In one embodiment, the automatic working system includes an interaction module, when the control module controls the movement module to enable the self-moving device to move to examine the map, the interaction module is electrically connected to the control module and is configured to perform interaction between the self-moving device and the user, and the control module modifies, based on an output of the interaction module, the map stored in the storage unit.

In one embodiment, the interaction module includes a communications module, configured to perform communication between the self-moving device and a smart terminal of the user.

In one embodiment, the interaction module includes an input/output device for observation or operation by the user.

In one embodiment, the self-moving device includes an obstacle detection sensor, electrically connected to the control module, when the control module controls the movement module to enable the self-moving device to move to examine the map, the obstacle detection sensor is configured to detect an obstacle within the working area defined by the map, and the control module modifies, based on a detection result of the obstacle detection sensor, the map stored in the storage unit.

In one embodiment, the self-moving device includes a slope detection sensor, electrically connected to the control module, when the control module controls the movement module to enable the self-moving device to move to examine the map, the slope detection sensor is configured to detect slope information within the working area defined by the map, and the control module modifies, based on a detection result of the slope detection sensor, the map stored in the storage unit.

In one embodiment, the automatic working system includes a positioning device, when the control module controls the movement module to enable the self-moving device to move to examine the map, and the positioning device is configured to output a current position of the self-moving device.

In one embodiment, the control module modifies, according to the current position of the self-moving device output by the positioning device and the reliability of a signal output by the positioning device, the map stored in the storage unit.

In one embodiment, the control module controls the movement module to enable the self-moving device to move to examine the modified map.

Embodiments of the present invention further provide a control method of a self-moving device, wherein the self-moving device includes: a movement module, enabling the self-moving device to move; and a task execution module, executing a working task; and the control method of a self-moving device includes the following steps: recording and storing a working area map; after the map is stored, and before the task execution module is controlled to execute the working task, the movement module is controlled to enable the self-moving device to move within a working area defined by the map, to examine the map; and when the map is being examined, enabling the self-moving device to move under the observation by a user.

In one embodiment, a map examination process includes the following step: controlling the movement module to enable the self-moving device to move along a boundary recorded on the map.

In one embodiment, a map examination process includes the following step: controlling the movement module to enable the self-moving device to move to cover the working area defined by the map.

In one embodiment, a map examination process includes the following steps: locating a current position of the self-moving device, comparing the current position of the self-moving device with a position recorded on the stored map, and determining whether the self-moving device is located within the working area defined by the map.

In one embodiment, when the map is being examined, the task execution module is controlled to keep a nonworking state.

In one embodiment, the map is modified based on an observation result of the user.

In one embodiment, a map examination process includes the following steps: controlling the self-moving device to interact with the user, and modifying the map based on an interaction result.

In one embodiment, the movement module is controlled to enable the self-moving device to move to examine the modified map.

Embodiments of the present invention further provide a self-moving device, automatically moving within a working area based on a working area map, and including a housing, a movement module, a task execution module, and a control module, where the control module controls the movement module to enable the self-moving device to move, and controls the task execution module to execute a working task; the control module obtains the current position of the self-moving device from a positioning device; the working area map includes position information of one or more positions in the working area; the self-moving device includes a map confirmation mode, and in the map confirmation mode, the control module controls the self-moving device to automatically move based on the working area map, and controls the task execution module not to execute the working task.

Compared with the prior art, the beneficial effects of the present invention are as follows: After the storage unit stores the map, and before the control module controls the task execution module to execute the working task, the control module controls the movement module to enable the self-moving device to move to examine the map, to prevent a safety problem caused by an inaccurate map when the self-moving device executes the working task. A map examination process takes place under manual observation, so that the reliability of map examination is ensured. In a map examination process, the task execution module is kept from working, so that the safety of an examination process is ensured.

Embodiments of the present invention further provide an automatic lawn mower that requires simplified use preparation and implements a fast return.

An automatic lawn mower includes:

a working area recognition module, configured to determine whether an area that the automatic lawn mower is about to cover is a working area;

a drive module, configured to drive the automatic lawn mower to walk within the working area;

a positioning module, configured to receive a positioning signal, to obtain the coordinates of a current position of the automatic lawn mower or a coordinate area formed of a plurality of coordinates;

a map construction and storage module, configured to: determine whether the coordinates are stored on a working map, and when it is determined that the coordinates are not stored, add the coordinates to the working map to obtain an updated working map;

a return path planning module, configured to: receive a return instruction, generate a return path according to the updated working map, and control the automatic lawn mower to return from a position before returning to a predetermined position along the return path.

The automatic lawn mower can start rapidly to work and improve a working map during working. After finishing work, the automatic lawn mower can navigate according to an existing working map to implement a fast return. A user does not need to train the automatic lawn mower in advance to learn about all working areas.

In one embodiment, the predetermined position is a charging station.

In one embodiment, the working area recognition module includes a grassland detection module, used to recognize whether an area that the automatic lawn mower is about to cover is grassland.

In one embodiment, the positioning module has a communications module used to receive the positioning signal, and the communications module includes one or more of a Global Positioning System (GPS) module, a Differential GPS (DGPS) module, an ultra-wideband (UWB) module, a Zigbee module, a Wireless Fidelity (Wi-Fi) module, an ultrasound receiving module, an inertial navigation module, an odometer, an electronic map, and an acceleration sensor.

In one embodiment, the return path is the shortest path that is from the position before returning to the predetermined position and is defined by known coordinates on the working map.

In one embodiment, the return path planning module is further configured to record the numbers of times that known coordinates on the working map have been covered by the automatic lawn mower, and the return path is determined by the position coordinates before returning, the coordinates of the predetermined position, and known coordinates that have been least often covered by the automatic lawn mower between the position before returning and the predetermined position.

A walking method of an automatic lawn mower is further provided, and includes the following steps:

determining whether an area that an automatic lawn mower is about to cover is a working area;

driving the automatic lawn mower to walk within the working area;

receiving a positioning signal, to obtain the coordinates of a current position of the automatic lawn mower or a coordinate area formed of a plurality of coordinates;

determining whether the coordinates are stored on a working map, and when it is determined that the coordinates are not stored, adding the coordinates to the working map to obtain an updated working map; and receiving a return instruction, generating a return path according to the updated working map, and controlling the automatic lawn mower to return from a position before returning to a predetermined position along the return path.

In one embodiment, the return path is the shortest path that is from the position before returning to the predetermined position and is defined by known coordinates on the working map.

In one embodiment, the step of receiving a return instruction, generating a return path according to the updated working map, and controlling the automatic lawn mower to return from a position before returning to a predetermined position along the return path includes:

recording the numbers of times that known coordinates on the working map have been covered by the automatic lawn mower; and generating the return path according to the position coordinates before returning, the coordinates of the predetermined position, and known coordinates that have been least often covered by the automatic lawn mower between the position before returning and the predetermined position.

In one embodiment, the origin of a coordinate system of the coordinates is the predetermined position.

BRIEF DESCRIPTION OF THE DRAWINGS

The foregoing objectives, technical solutions, and beneficial effects of the present invention may be implemented by using the following accompanying drawings.

DETAILED DESCRIPTION

Figure 1:
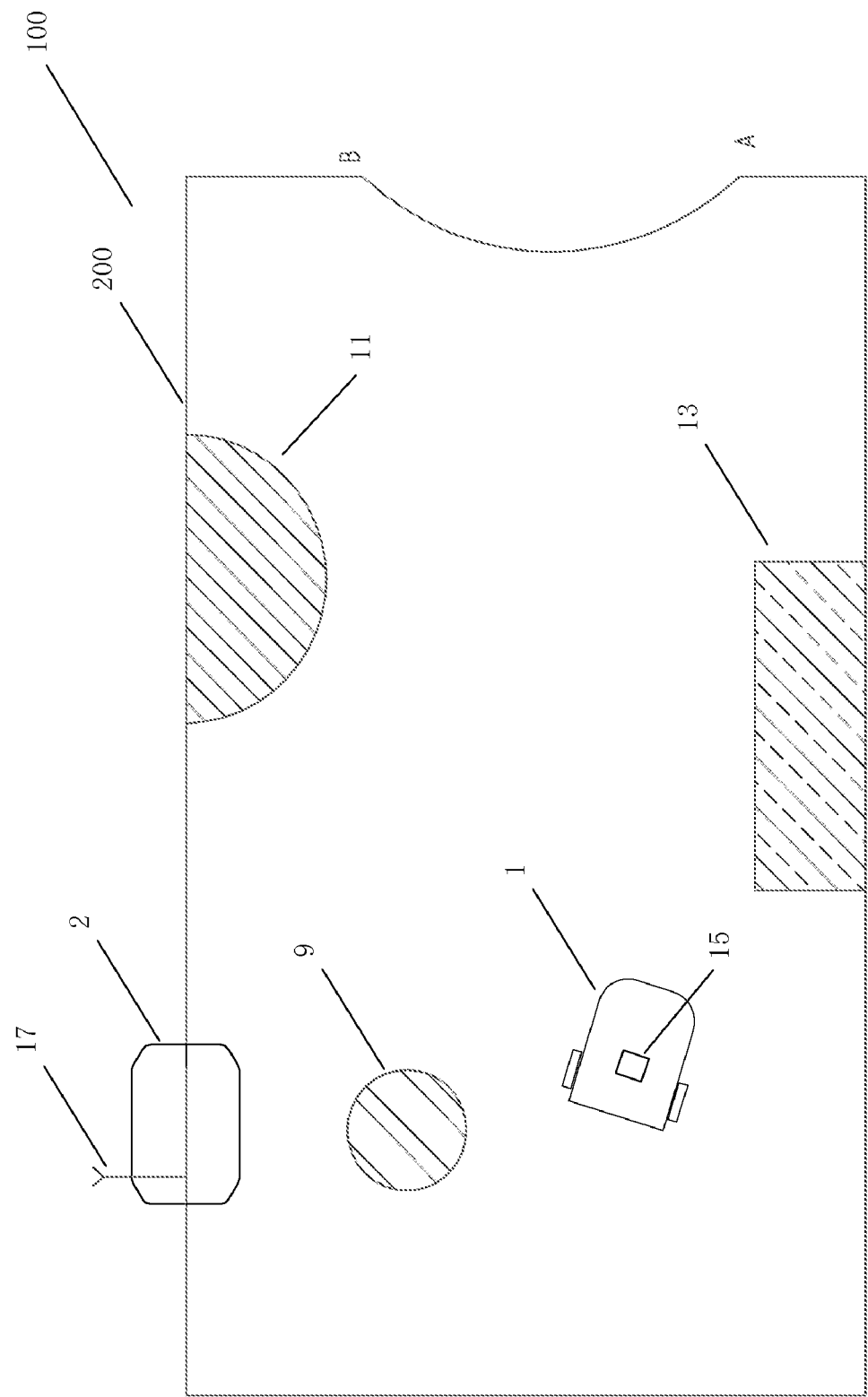
FIG. 1 is a schematic diagram of an automatic working system according to a first embodiment of the present invention.

FIG. 1 is a schematic diagram of an automatic working system 100 according to a first embodiment of the present invention. The automatic working system includes a self-moving device. In this embodiment, the self-moving device is an automatic lawn mower 1. In another embodiment, the self-moving device may be an automatic cleaning device, an automatic irrigation device, and an automatic snowplow, among other devices suitable for working in an unattended manner. The automatic working system 100 further includes a charging station 2, configured to supply electrical power to the automatic lawn mower 1.

Figure 2:
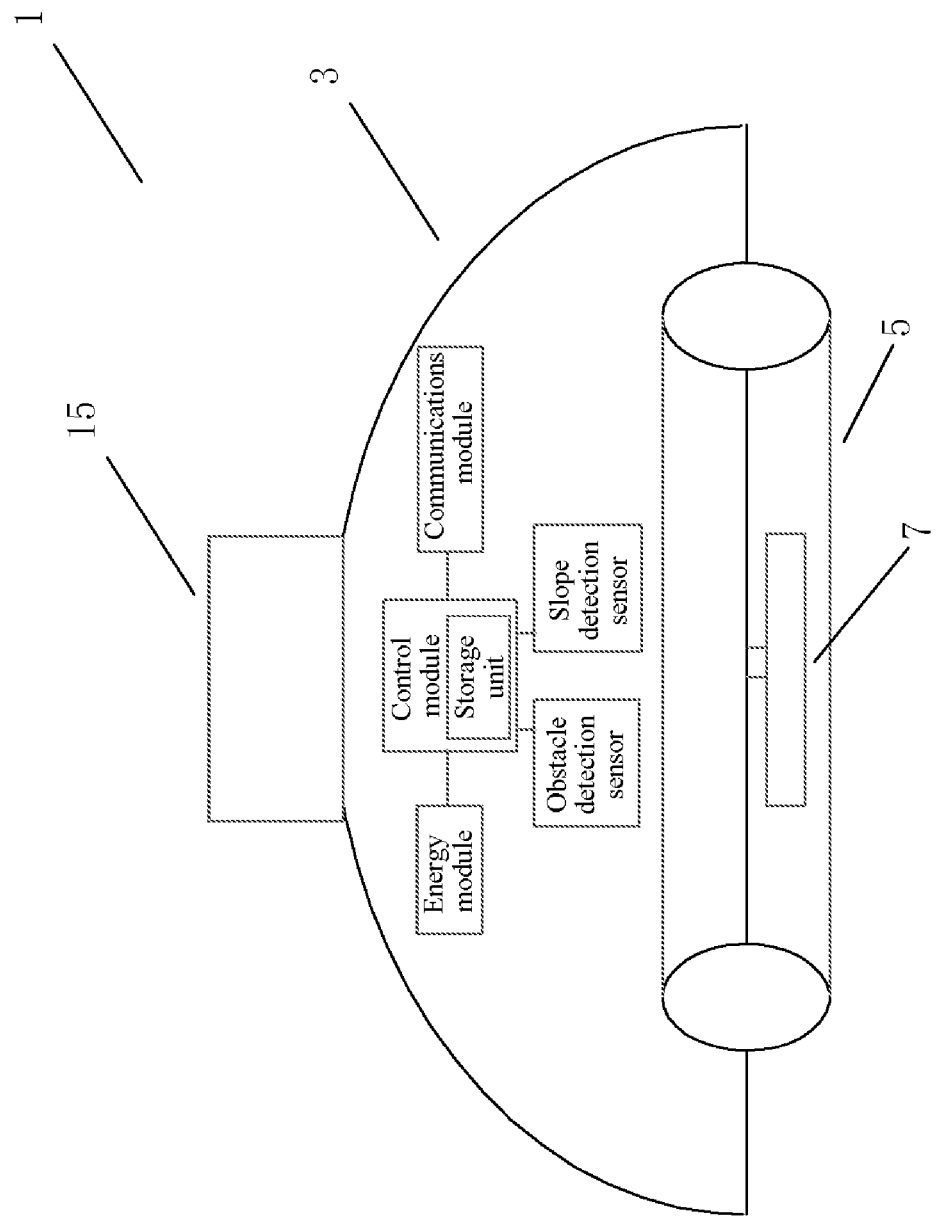
FIG. 2 is a schematic structural diagram of an automatic lawn mower according to the first embodiment of the present invention.

FIG. 2 is a schematic structural diagram of the automatic lawn mower 1 according to the first embodiment of the present invention. In this embodiment, the automatic lawn mower 1 includes: a housing 3; a movement module, mounted at the housing 3, where the movement module includes a caterpillar track 5 driven by a drive motor to enable the automatic lawn mower 1 to move; and a task execution module, mounted at the bottom of the housing 3, including a cutting assembly 7 for executing grass cutting work. The automatic lawn mower 1 further includes an energy module. The energy module includes a battery pack for supplying energy for the movement and working of the automatic lawn mower 1. The automatic lawn mower 1 further includes a control module, electrically connected to the movement module, the task execution module, and the energy module, controlling the movement module to enable the automatic lawn mower 1 to move, and controlling the task execution module to execute a working task. In this embodiment, the control module includes a storage unit, storing a working area map.

As discussed in the prior art, there are a plurality of map creation methods. In this embodiment, in a map creation method, the charging station 2 is used as the origin to create a spatial coordinate system, a positioning device is used to record position coordinates of a working area, and the position coordinates of the working area are processed to generate a working area map. The working area map includes position information of one or more positions in the working area. In another embodiment, a user may manually choose a working area in an electronic map to obtain a working area map.

Referring to FIG. 1, in this embodiment, the automatic working system includes a positioning device. The positioning device includes a satellite positioning device and is a satellite navigation system. The satellite navigation system uses the GPS to perform navigation. Certainly, in another embodiment, the satellite navigation system may use the Galileo satellite navigation system, the Beidou satellite navigation system or the like to perform navigation. In this embodiment, the satellite positioning device includes a mobile station 15. The mobile station 15 may move along with the automatic lawn mower 1 and output a current position of the automatic lawn mower. In this embodiment, the satellite navigation system further includes a base station 17. The base station 17 is fixedly arranged. In one embodiment, the base station 17 is arranged on the charging station 2. The base station 17 communicates with the mobile station 15 wirelessly. The base station 17 sends a positioning correction signal to the mobile station 15 to implement DGPS positioning. In this embodiment, the mobile station 15 is detachably mounted at the housing 3 of the automatic lawn mower 1. The mobile station 15 may independently work when being detached from the automatic lawn mower 1, and record coordinates of a position that has been covered by the mobile station 15. When being mounted on the housing 3 of the automatic lawn mower 1, the mobile station 15 is electrically connected to the control module of the automatic lawn mower 1 and outputs the coordinates of the current position of the automatic lawn mower 1. In this embodiment, the mobile station 15 is detached from the automatic lawn mower 1 to record the map. The user holds the mobile station 15 and moves to record position coordinates of a working area boundary, an obstacle, or the like. In this embodiment, the positioning device further includes an inertial navigation device. The inertial navigation device includes a gyroscope, an accelerometer, or the like. The inertial navigation device may output the coordinates of the current position of the automatic lawn mower 1 according to an initial position of the automatic lawn mower 1. The inertial navigation device can be used in combination with the satellite positioning device and provides assisted navigation in the case of weak satellite signals.

In this embodiment, the working area map includes boundary information of the working area, obstacle information in the working area, slope information in the working area, strength information of satellite signals received by the working area, or the like. Within the working area shown in FIG. 1, a natural boundary, that is, an actual working area boundary 200, is formed between a lawn and a non-lawn area. An obstacle 9, a gradient 11 or further an area 13 with weak satellite signals exists in the working area. The obstacle 9 may be a tree, a pit or the like. The gradient 11 is a working area having a slope exceeding a threshold. When working on a gradient, the automatic lawn mower may change a movement manner to improve the stability and working efficiency. The area 13 with weak satellite signals may be an area blocked by a house, an area shadowed by vegetation or the like. The automatic lawn mower 1 cannot receive desirable satellite signals in these areas. The satellite positioning device cannot output an accurate position signal. In this embodiment, although the inertial navigation device is used synchronously to perform navigation, when the automatic lawn mower 1 stays in an area with weak satellite signals for a long time, the inertial navigation device cannot output an accurate position signal due to the accumulation of errors. Therefore, when the automatic lawn mower 1 moves in an area with weak satellite signals, a movement manner different from that in an area with desirable satellite signals may used for movement.

Figure 3:
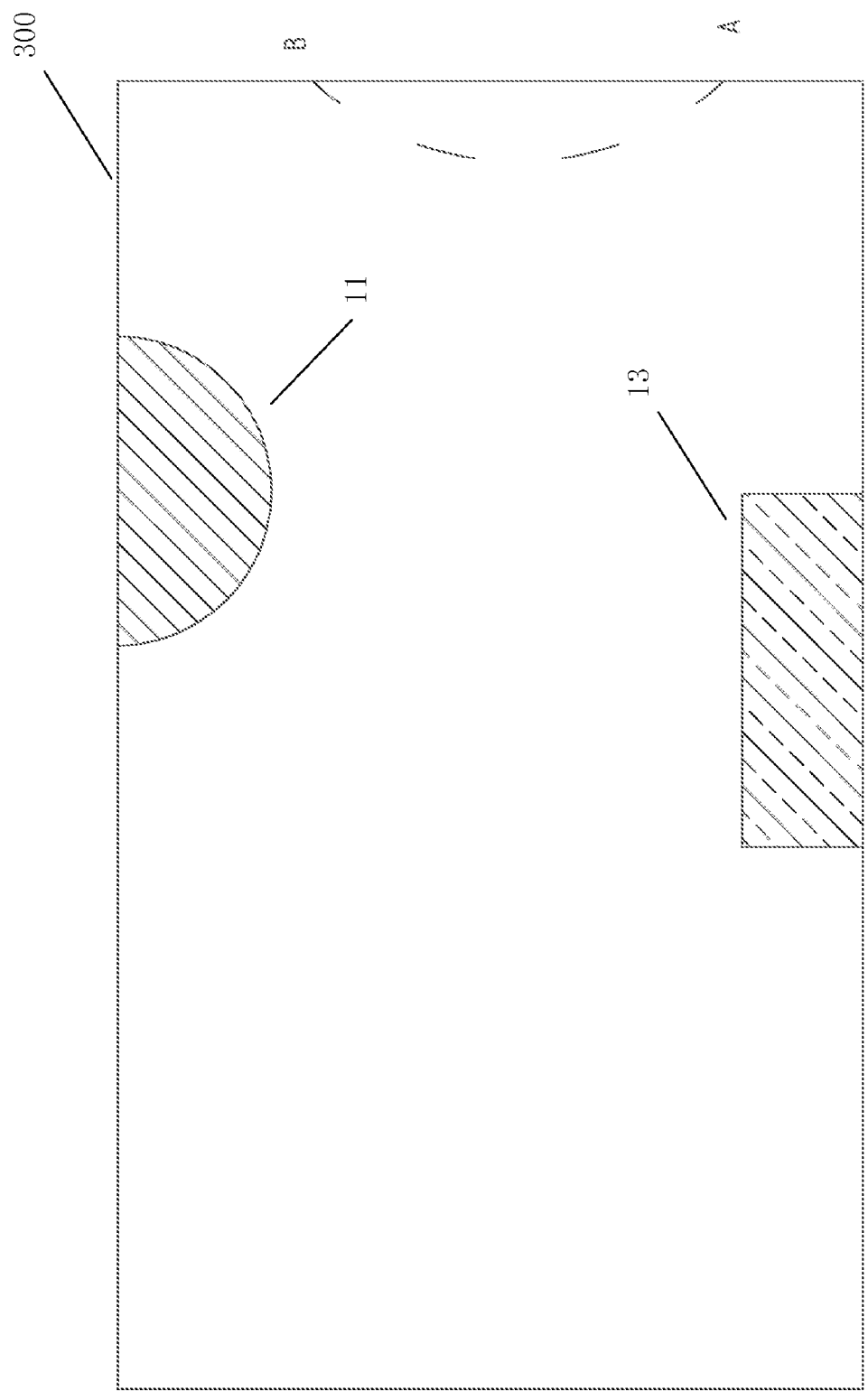
FIG. 3 is a schematic diagram of a working area map according to the first embodiment of the present invention.

FIG. 3 is a schematic diagram of a working area map shown on a display device. By comparing FIG. 1 with FIG. 3, the working area recorded on the map may be offset from an actual working area. For example, the right-side boundary of the actual working area includes a portion concave towards the center of the working area. The position of a boundary recorded on the map 300 fails to accurately represent the concave portion. That is, the position of the boundary 300 recorded on the map is inaccurate. As a result, during the movement of the automatic lawn mower 1 in an area near the boundary, when the automatic lawn mower 1 moves into an area outside the actual working area boundary 200, a safety problem occurs. For another example, the actual working area includes an obstacle 9 Specifically, the obstacle 9 may be a pit. However, the position of the pit is not recorded on the map. As a result, the automatic lawn mower 1 moves to the position of the pit and falls, and a safety problem occurs.

In this embodiment, after the storage unit stores the map, and before the control module controls the automatic lawn mower 1 to execute grass cutting work, the control module controls the movement module to enable the automatic lawn mower 1 to move within a working area defined by the map to examine whether the map is accurate. In this embodiment, the automatic working system includes a manual observation mode, and in the manual observation mode, the automatic working system works under the observation of the user. The automatic working system works in the manual observation mode when the control module controls the movement module to enable the automatic lawn mower 1 to move to examine the map, thereby ensuring the reliability of map examination. The automatic working system includes an interaction module, and in the manual observation mode, the interaction module provides interaction between the automatic lawn mower 1 and the user. In this embodiment, the interaction module includes a communications module, configured to perform communication between the automatic lawn mower 1 and a smart terminal of the user.

In this embodiment, as the automatic lawn mower 1 examines the map, the control module controls the cutting assembly 7 of the automatic lawn mower 1 to keep a nonworking state. Therefore, even if the recorded map is inaccurate and the automatic lawn mower 1 moves into an unsafe area, for example, moves outside an actual working area boundary or moves into a pit, the cutting assembly 7 is prevented from injuring a human or damaging another object, so that the safety of an examination process is ensured. The foregoing process is referred to as a map confirmation mode of the automatic lawn mower. That is, in the map confirmation mode, the control module controls the automatic lawn mower to move based on the working area map, and controls the task execution module not to execute the working task.

In this embodiment, as the automatic lawn mower 1 examines the map, the mobile station 15 is mounted at the housing 3 of the automatic lawn mower 1, is electrically connected to the control module of the automatic lawn mower 1, and outputs the current position of the automatic lawn mower 1. The control module compares the current position of the automatic lawn mower 1 with the position recorded on the stored map, determines whether the automatic lawn mower 1 is moving within the working area defined by the map. If determining that the automatic lawn mower 1 moves to a position outside the working area defined by the map, the control module controls the automatic lawn mower 1 to change a movement manner and move towards the working area.

In this embodiment, a map examination process by the automatic lawn mower includes the following step: controlling, by the control module, the movement module to enable the automatic lawn mower to move along the boundary recorded on the map, to examine whether the boundary recorded on the map is accurate.

In this embodiment, when the control module controls the movement module to enable the automatic lawn mower to move along the boundary recorded on the map, the user observes the movement of the automatic lawn mower to determine whether the automatic lawn mower is moving along the actual working area boundary. In this embodiment, the automatic lawn mower is controlled to start from a charging station to move counterclockwise along the boundary recorded on the map. When the automatic lawn mower moves to Point A on the right-side boundary of the working area, because the boundary recorded on the map is offset towards the right side with respect to the actual working area boundary, the automatic lawn mower gradually deviates from the actual working area boundary if moving along the boundary recorded on the map. A non-lawn area such as a road may exist on the right side of the actual working area boundary. If the automatic lawn mower moves to the area during grass cutting work, a safety problem may occur. In this case, the user observes the movement of the automatic lawn mower to find that the automatic lawn mower has deviated from the actual working area boundary. The user may enable the automatic lawn mower to stop moving. In this embodiment, the user observes the automatic lawn mower to examine the map, so that it is ensured that an examination result of the map is reliable.

In a map examination process by the automatic lawn mower, the user corrects the map when finding that the map is inaccurate. In this embodiment, the automatic working system includes a communications module. The communications module may be integrated with a mobile station or may be arranged independently on the automatic lawn mower, and is electrically connected to the control module. When the automatic lawn mower is examining the map, the communications module is configured to perform wireless communication between the automatic lawn mower and the smart terminal of the user. Specifically, when the automatic lawn mower is examining the map, the communications module sends information about the current position of the automatic lawn mower to the smart terminal of the user. The smart terminal of the user stores and can display the working area map and at the same time display the current position of the automatic lawn mower. When the automatic lawn mower is examining the map, the user observes the movement of the automatic lawn mower. When the automatic lawn mower deviates from the actual working area boundary, the user records the position Point A from which the automatic lawn mower starts to deviate from the actual working area boundary. Because the cutting assembly of the automatic lawn mower is not working, the automatic lawn mower is allowed to continue moving to return to the actual working area boundary. The user records the position Point B at which the automatic lawn mower returns to the actual working area boundary. After the user obtains the start position Point A and the end position Point B of the part where the boundary recorded on the map deviates from the actual working area boundary, the automatic lawn mower is controlled to stop moving, and the positioning device is then used to record again position coordinates of the actual working area boundary including the part from Point A to Point B, and the position coordinates of the boundary that are recorded again are used to correct the map.

In this embodiment, after the user corrects the map, the control module modifies the map stored in the storage unit, and controls the movement module again to enable the automatic lawn mower to move to examine whether the modified map is correct. Specifically, the automatic lawn mower is enabled to return to a corrected start position on the map or a position that is on the boundary on the map and is located before the corrected start position of the map, so that the automatic lawn mower moves along the boundary on the corrected map. In this case, the cutting assembly is still controlled to keep a nonworking state to ensure the safety of an examination process. Similarly, the user observes the movement of the automatic lawn mower and determines whether the automatic lawn mower is moving along the actual working area boundary. If the automatic lawn mower keeps moving along the actual working area boundary in a process of moving to the corrected end position of the map, it indicates that the map is correct. If the automatic lawn mower deviates from the actual working area boundary again, it indicates that the map is still incorrect, and the map needs to be corrected again. In this embodiment, the movement module is controlled to enable the automatic lawn mower to move to examine the corrected map, so that the reliability of map examination is further ensured.

In a second embodiment of the present invention, a map examination method of an automatic lawn mower is basically the same as that in the first embodiment, and a difference lies in that the map is corrected in a manner different from that in the first embodiment. Specifically, after a user obtains the start position Point A and the end position Point B of a part where the boundary of the map deviates from the actual working area boundary, the smart terminal of the user labels the start position Point A and the end position Point B on the displayed map. The user manually connects the start position Point A and the end position Point B on the display screen of the smart terminal to modify the map. Specifically, the user may determine the shape of the boundary between the start position Point A and the end position Point B according to shape features of an actual boundary or may determine, according to the offset of the boundary that is recorded on the map and has not been corrected with respect to the actual working area boundary, an offset of the boundary between the start position Point A and the end position Point B with respect to the boundary that is recorded on the map and has not been corrected. Similarly, after the user corrects the map, the control module modifies the map stored in the storage unit, and controls the movement module again to enable the automatic lawn mower to move to examine whether the modified map is correct.

In a third embodiment of the present invention, a map examination method of an automatic lawn mower is basically the same as that in the first embodiment, and a difference lies in that the map is corrected in a manner different from that in the first embodiment. Specifically, when a user determines that the automatic lawn mower deviates from the actual working area boundary, the automatic lawn mower is controlled to stop moving, so that the automatic lawn mower returns to a position Point A from which the automatic lawn mower starts to deviate from the actual working area boundary or a position before Point A, and the start position is recorded. The user uses a smart terminal to remotely control the automatic lawn mower to move, to enable the automatic lawn mower to move along the actual working area boundary. When moving along the actual working area boundary, the automatic lawn mower records coordinates of positions have been covered by the automatic lawn mower. The user observes a current position of the automatic lawn mower on a map displayed on the smart terminal, and determines whether the current position of the automatic lawn mower has returned to the boundary recorded on the map that has not been corrected. If the current position of the automatic lawn mower has returned to the boundary recorded on the map that has not been corrected, the remote control of the automatic lawn mower is stopped, and the end position is recorded. The position coordinates recorded by the automatic lawn mower in a remote control mode are used to correct the map. Similarly, after the user corrects the map, the control module modifies the map stored in the storage unit, and controls the movement module again to enable the automatic lawn mower to move to examine whether the modified map is correct.

In the first embodiment of the present invention, after the user corrects the map, if the map is correct, the automatic lawn mower is controlled to continue to move along the boundary recorded on the map until the automatic lawn mower has moved along the entire boundary of the map once. If the map is incorrect, the map is corrected again. When the map is corrected again, the map correction method in the second embodiment or the third embodiment may be used.

In the first embodiment of the present invention, the boundary recorded on the map deviates outwards with respect to the actual working area boundary. In another embodiment, the boundary recorded on the map may deviate inwards with respect to the actual working area boundary. In this case, the foregoing method may be similarly used to correct the boundary recorded on the map, so that the boundary recorded on the map is consistent with the actual working area boundary and it is avoided that an area near the actual working area boundary is left uncut, so that a lawn can be desirably cut.

In the first embodiment of the present invention, a map examination process by the automatic lawn mower further includes the following steps: controlling, by the control module, the movement module to enable the automatic lawn mower to move to cover a working area defined by the map, and examining whether obstacle information in the working area recorded on the map or slope information in the working area or strength information of satellite signals received in the working area is accurate, particularly, examining whether an unsafe area that is not recorded on the map exists in an actual working area. It is examined whether the automatic lawn mower encounters an exception, for example, the automatic lawn mower is stuck, falls off, has a collision, stalls, slips, or leaves the working area.

The working area defined by the map includes a working area inside boundary positions recorded on the map. If an area on the map is labeled as an unsafe area, for example, labeled as a pit, the automatic lawn mower is not allowed to enter the area. The working area defined by the map has excluded the unsafe area.

When the automatic lawn mower covers the working area defined by the map, the automatic lawn mower may move along a random path or may move along a preset path, where the preset path is automatically generated by a program according to the shape of the boundary of the map. In this embodiment, the automatic lawn mower is enabled to cover the working area defined by the map along the preset path.

In this embodiment, the automatic lawn mower includes an environmental sensor. Specifically, the automatic lawn mower includes an obstacle detection sensor, detecting an obstacle in a movement direction of the automatic lawn mower. Specifically, the obstacle detection sensor includes a collision detection sensor. When the collision detection sensor detects that the automatic lawn mower encounters a collision, the control module determines that an obstacle exists in the movement direction of the automatic lawn mower. The obstacle detection sensor may further include a non-contact sensor such as an ultrasound sensor that detects an obstacle in the movement direction of the automatic lawn mower in place of the collision detection sensor. The obstacle detection sensor may further include a cliff detection sensor, detecting whether a pit or the like exists in the movement direction of the automatic lawn mower. Certainly, a camera may be used to detect an obstacle in the movement direction of the automatic lawn mower. When the obstacle detection sensor detects that an obstacle exists in the movement direction of the automatic lawn mower, the control module obtains the position of the detected obstacle, and compares the position of the detected obstacle with positions labeled as obstacles on the stored map. If the position of the detected obstacle is inconsistent with any position labeled as an obstacle on the stored map, it is determined that the detected obstacle is an unknown obstacle. The control module controls the communications module to send information to the smart terminal of the user to prompt the user to correct the map. Certainly, the automatic lawn mower may use an obstacle detection sensor such as an accelerometer or a lift sensor to determine whether the automatic lawn mower encounters an accident, for example, is stuck or overturned. If it is determined that the automatic lawn mower is stuck or overturned, a notification is sent to the user to prompt the user to correct the map. These unsafe areas are labeled on the map to prevent the automatic lawn mower from entering these unsafe areas when executing grass cutting work.

In this embodiment, the automatic lawn mower further includes a slope detection sensor, detecting the slope of a working area. Specifically, the slope detection sensor detects the tilt of the automatic lawn mower to indirectly obtain the slope of a working area in which the automatic lawn mower is located. The control module determines whether the slope of the working area exceeds a threshold. If the slope exceeds the threshold, it is determined that the working area in which the automatic lawn mower is currently located is a gradient. The control module compares the position of the detected gradient with positions labeled as gradients on the stored map. If the position of the detected gradient is inconsistent with any position labeled as a gradient on the stored map, the communications module is controlled to send information to the smart terminal of the user to prompt the user to correct the map.

In this embodiment, the control module determines satellite signal strength in the working area according to the reliability of a positioning signal output by the satellite positioning device. For example, when the satellite positioning device can receive signals from only three or fewer satellites, the control module determines that the current position has weak satellite signals. The control module compares the detected position with weak satellite signals with positions labeled with weak satellite signals on the stored map. If the detected position with weak satellite signals is inconsistent with any position labeled with weak satellite signals on the stored map, the communications module is controlled to send information to the smart terminal of the user to prompt the user to correct the map.

After receiving, by using the smart terminal, map correction prompt information sent by the automatic lawn mower, the user may control the automatic lawn mower to stop moving. The user observes the position of the automatic lawn mower, determines whether the detection of the automatic lawn mower is correct. After confirming that the detection of the automatic lawn mower is correct, the user corrects the map. The map is corrected in a manner similar to that of correcting the boundary recorded on the map. After the user corrects the map, the control module modifies the map stored in the storage unit, and controls the automatic lawn mower to move to examine the corrected map. Specifically, in this embodiment, the automatic lawn mower is enabled to return to a position where an obstacle, a gradient or weak satellite signals are detected or a position before the position, and continue to cover the working area defined by the map. As the automatic lawn mower covers the working area defined by the map, if finding again a position with an unknown obstacle, gradient or weak satellite signals, the automatic lawn mower notifies the user again to prompt the user to correct the map until the automatic lawn mower finishes covering the working area defined by the map.

In this embodiment, as the automatic lawn mower covers the working area defined by the map to examine the map, the cutting assembly is controlled to keep a nonworking state. Therefore, even if the recorded map is inaccurate, the cutting assembly can be prevented from injuring a human or damaging another object, so that the safety of the automatic working system is ensured. For example, when the automatic lawn mower enters an unsafe area and is overturned, a safety problem that occurs when a human is near the automatic lawn mower is avoided. For another example, when the automatic lawn mower enters a non-lawn area, the cutting assembly is prevented to damage an object in the non-lawn area during working.

In this embodiment, the automatic lawn mower notifies the user when detecting an unknown obstacle, gradient or area with weak satellite signals during coverage, and the user determines whether the detection of the automatic lawn mower correct, so that the reliability of map examination is ensured.

In a fourth embodiment of the present invention, a map examination method of an automatic lawn mower is basically the same as that in the first embodiment, and a difference lies in that as the automatic lawn mower covers a working area defined by the map, a user observes the movement and state of the automatic lawn mower to directly determine whether the map is accurate. Specifically, as the automatic lawn mower covers the working area defined by the map, the user observes the automatic lawn mower to determine whether the automatic lawn mower encounters an unknown obstacle, gradient or area with weak satellite signals. The user may further determine whether a movement manner of the automatic lawn mower is appropriate, and may further determine whether the automatic lawn mower is moving along a preset path generated by a program. If determining that the automatic lawn mower encounters an unknown obstacle, gradient or area with weak satellite signals, the user corrects the map in a manner similar to the method in the first embodiment. If determining that the movement manner of the automatic lawn mower is inappropriate or determining that the automatic lawn mower deviates from the preset path, the user may control the automatic lawn mower to stop moving and manually set a movement manner on the smart terminal, or manually modify a path based on the preset path displayed on the smart terminal, or remotely control the automatic lawn mower to move to modify a path, or perform another operation. The observation of the user ensures the reliability of map examination.

In the automatic working system in the first embodiment of the present invention, after the storage unit stores the map and before the control module controls the cutting assembly to execute grass cutting work, the control module controls the movement module to enable the automatic lawn mower to move within the working area defined by the map to examine the map. After the map has been examined, the automatic lawn mower enters a working mode. The control module then controls the automatic lawn mower to move within the working area defined by the map and execute grass cutting work. In this embodiment, because a map examination step is implemented before the automatic lawn mower is controlled to execute grass cutting work, the accuracy of the map stored in the storage unit is ensured, and a safety accident that occurs during working of the automatic lawn mower because the map is inaccurate is prevented. Therefore, the automatic working system in this embodiment is a safe automatic working system. In this embodiment, the map examination step is performed when the cutting assembly is controlled to stay off, so that the safety of the map examination step is ensured. In this embodiment, the map is examined under the observation of the user, so that the reliability of map examination is ensured. Therefore, the map examination method in this embodiment is a safe and reliable method, so that the safety of the automatic working system in this embodiment is further ensured.

Figure 4:
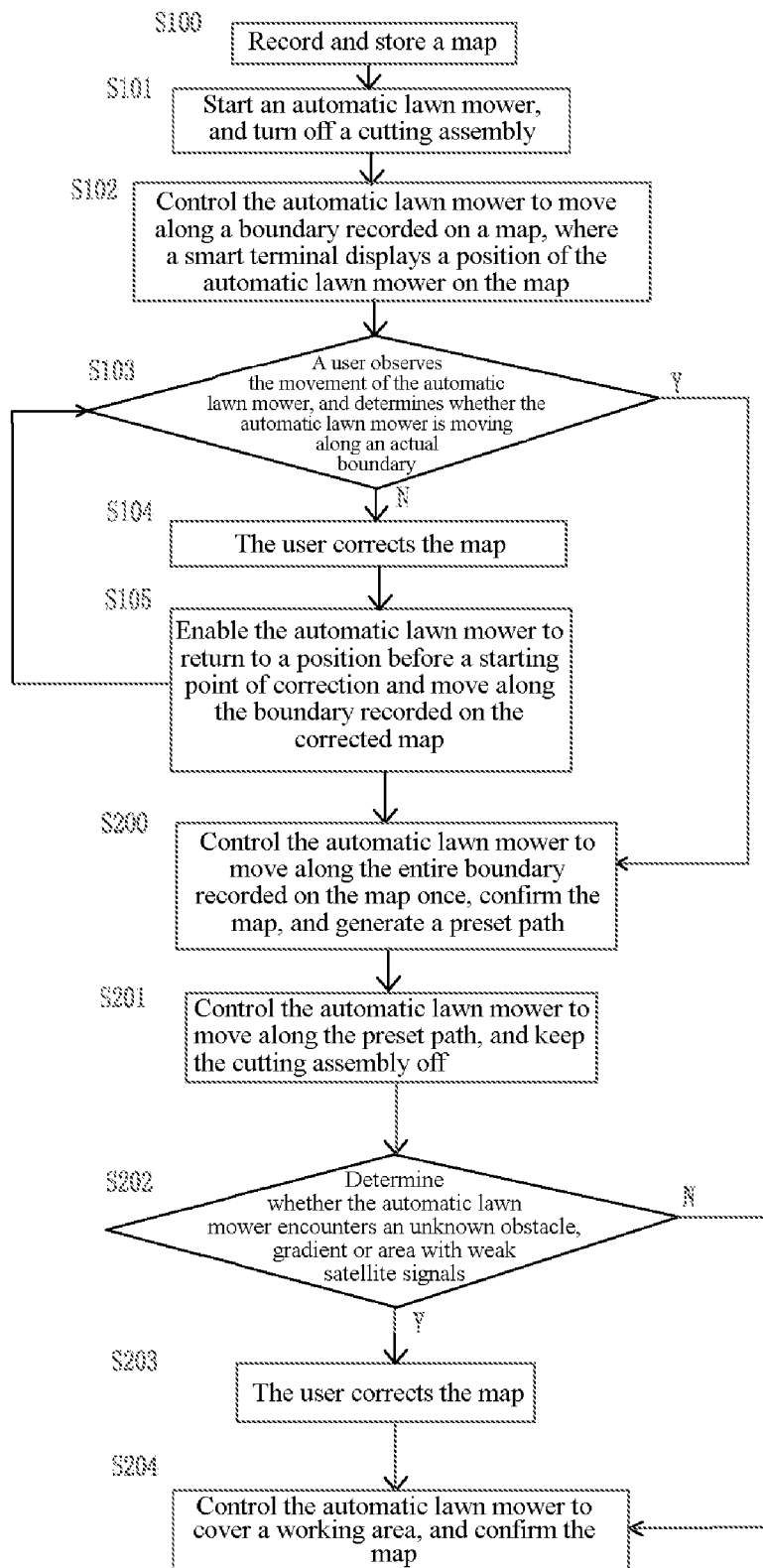
FIG. 4 is a flowchart of examining a map by the automatic working system according to the first embodiment of the present invention.

A procedure in which the automatic working system in the first embodiment of the present invention examines a map is shown in FIG. 4, and includes the following steps:

S100: Record and store a map.

S101: Start an automatic lawn mower, and turn off a cutting assembly.

S102: Control the automatic lawn mower to move along a boundary recorded on a map, where a smart terminal displays a position of the automatic lawn mower on the map.

S103: A user observes the movement of the automatic lawn mower, and determines whether the automatic lawn mower is moving along an actual working area boundary, where if the automatic lawn mower moves along the actual working area boundary, the process turns to step S200, or if the automatic lawn mower does not move along the actual working area boundary, the process turns to step S104.

S104: The user corrects the map.

S105: Enable the automatic lawn mower to return to a position before a starting point of correction and move along the boundary recorded on the corrected map, where the process returns to step S103.

S200: Control the automatic lawn mower to move along the entire boundary recorded on the map once, confirm the map, and generate a preset path.

S201: Control the automatic lawn mower to move along the preset path, and keep the cutting assembly off.

S202: Determine whether the automatic lawn mower encounters an unknown obstacle, gradient or area with weak satellite signals, where if yes, the process turns to enter step S203, or if not, the process turns to step S204.

S203: The user corrects the map.

S204: Control the automatic lawn mower to cover a working area, and confirm the map.

In the first embodiment of the present invention, position coordinates recorded by the positioning device may be transmitted to the control module of the automatic lawn mower through an electrical connection between a mobile station and the automatic lawn mower, or may be wirelessly transmitted to the smart terminal of the user. The map stored in the storage unit may be generated by the control module, or may be generated by the positioning device, or may be generated by the smart terminal. The preset path may be generated by a program in the control module, or generated by a program in the positioning device, or generated by a program in the smart terminal. In this embodiment, the preset path is updated according to the correction of the map.

In this embodiment, as the automatic lawn mower examines a map, the automatic lawn mower communicates with the smart terminal of the user by using the communications module, for example, sends information about the current position to the smart terminal, receives a movement stop instruction sent by the smart terminal, and receives map correction information sent by the smart terminal.

In another embodiment, the automatic working system may further include an input/output device. The input/output device may be integrated with a mobile station of the positioning device, or may be independently mounted on the automatic lawn mower, and is electrically connected to the control module. The input/output device may include a touchscreen. When the automatic lawn mower examines a map, the touchscreen is configured to display the map and the current position of the automatic lawn mower. When observing the movement of the automatic lawn mower, the user may simultaneously observe the current position of the automatic lawn mower on the touchscreen. The touchscreen may further be operated by the user to correct the map. Therefore, the touchscreen may be used in place of the communications module as an interaction module for implementing interaction between the automatic lawn mower and the user.

In the first embodiment of the present invention, the user may press a stop button on the automatic lawn mower to control the automatic lawn mower to stop moving.

In this embodiment, the automatic lawn mower may further include an alert unit. As the automatic lawn mower covers the working area defined by the map, when an unknown obstacle, gradient or area with weak satellite signals is found, the alert unit sends an alert signal.

In this embodiment, the actual working area boundary may be a natural boundary between a lawn and a non-lawn area or may be defined by the user as required.

In this embodiment, as the automatic lawn mower covers the working area defined by the map, when the control module determines that the unknown obstacle is a tree or the like that can be easily avoided by the automatic lawn mower, instead of notifying the user, the automatic lawn mower records the position of the obstacle and corrects the map.

In this embodiment, as the automatic lawn mower covers the working area defined by the map, the control module may further determine and record a positioning precision square error and solution status of the current position, including a differential fixing solution, a floating-point solution, a pseudorange solution, a single-point solution, a non-satellite mode, an inertial navigation mode or the like.

In another embodiment of the present invention, the working area may include two or more separate areas and a channel connecting the separate areas, and the working area map includes information about the channel in the working area. The step of examining the working area map by the automatic lawn mower includes a step of moving along the channel in the working area.

In a fifth embodiment of the present invention, the automatic working system includes an automatic lawn mower and a positioning device. The automatic lawn mower includes a movement module, a task execution module, and a drive circuit connected to the movement module and the task execution module. The drive circuit drives the movement module to enable the automatic lawn mower to move, and drives the task execution module to execute a working task. Specifically, the task execution module includes a cutting assembly, the drive circuit drives the cutting assembly to execute cutting work. The positioning device is configured to detect a current position of the automatic lawn mower. The structures of the automatic lawn mower and the positioning device in this embodiment are basically the same as those in the first embodiment, and a difference lies in that, in this embodiment, the automatic working system includes: a storage unit, storing a working area map, and further storing a map confirmation procedure. The map confirmation procedure includes: providing a drive circuit instruction to move along a working area boundary, and receiving a confirmation signal from a user to complete the map confirmation procedure. The storage unit further stores a working procedure including providing a drive circuit instruction to move within a working area defined by the map and execute cutting work. The automatic working system further includes a control module. The control module monitors an output of the positioning device to execute the map confirmation procedure, and execute the working procedure after the map confirmation procedure is completed. Specifically, the automatic working system enters the map confirmation procedure in response to an instruction of the user. The control module receives a drive circuit instruction, and controls the movement module to enable the automatic lawn mower to move along the working area boundary. Specifically, based on the working area map (including position information of the working area boundary) stored in the storage unit and the current position of the automatic lawn mower output by the positioning device, the automatic lawn mower is controlled to move along the working area boundary. A control method is similar to that in the first embodiment. When receiving the confirmation signal from the user, the automatic working system labels the current working area map as a formal version and stores the working area map, to complete the map confirmation procedure. Specifically, when the control module executes the map confirmation procedure, the user observes the movement of the automatic lawn mower along the boundary based on the working area map and confirms whether the boundary of the current working area map is consistent with the actual working area boundary. The map confirmation procedure needs to be completed before the automatic working system can execute the working procedure. That is, the control module receives a drive circuit instruction, controls the movement module to enable the automatic lawn mower to move, and controls the cutting assembly to execute cutting work. Specifically, the control module controls, based on the confirmed (labeled as a formal version and stored) the working area map and the current position of the automatic lawn mower output by the positioning device, the automatic lawn mower to automatically move within the working area and execute cutting work.

In this embodiment, the automatic working system needs to execute the map confirmation procedure first before executing the working procedure, so that the accuracy of the stored working area map is ensured, and the safety of a working process of the automatic working system based on the working area map is ensured. The map confirmation procedure needs to be completed by receiving the confirmation signal from the user, so that the reliability of map confirmation is ensured.

In this embodiment, the working area boundary includes an outer boundary and an inner boundary of a working area. The inner boundary includes a boundary formed by the periphery of an obstacle, a flower bed, a pool, or the like. The automatic lawn mower is forbidden to enter an area enclosed by the inner boundary to work.

In this embodiment, the map confirmation procedure further includes providing a drive circuit instruction to keep the cutting assembly from executing cutting work. Specifically, after the automatic working system enters the map confirmation procedure, the control module receives a drive circuit instruction and controls the cutting assembly not to work. That is, as the control module controls the movement module to enable the automatic lawn mower to move along the working area boundary to confirm whether the boundary is accurate, the cutting assembly is in a non-working state. In this way, the safety of map confirmation is ensured, and the effect is similar to that in the first embodiment. Details are not described again.

In this embodiment, the map confirmation procedure further includes: after the drive circuit instruction is provided to move along the working area boundary, providing a drive circuit instruction to move within a working area defined by the boundary. The working area includes working areas defined by the outer boundary and the inner boundary. The working area defined by the inner boundary means a working area other than the area defined by the inner boundary. Specifically, the control module receives a drive circuit instruction, and controls the movement module to enable the automatic lawn mower to move within the working area defined by the boundary. Specifically, the control module controls, based on the working area map within the confirmed boundary and the current position of the automatic lawn mower output by the positioning device, the movement module to enable the automatic lawn mower to move within the working area defined by the boundary. In this embodiment, the map confirmation procedure may include two stages. In the first stage, it is confirmed whether the boundary of the working area map is accurate and whether the working safety of the system can be ensured. In the second stage, based on the confirmed boundary of the working area map, it is confirmed whether the working area map defined by the boundary is accurate and whether the working safety of the system can be ensured. Confirmation signals from the user are separately received in the two stages. To be specific, a boundary confirmation signal that is from the user and is used for confirming that the boundary of the working area map is accurate is received first. After the boundary confirmation signal from the user is received, it is confirmed in the second stage whether the working area map defined by the boundary is accurate. The map confirmation procedure is completed only after a map confirmation signal that is from the user and is used for confirming that the working area map defined by the boundary is accurate is received. In this embodiment, the boundary of the working area map needs to be confirmed before a working area defined by the boundary can be confirmed, so that it is ensured that the movement of the automatic lawn mower does not cross the actual working area boundary, thereby ensuring the safety and also ensuring that the automatic lawn mower can cover the entire working area while leaving no area uncut. In this embodiment, the confirmation of the working area defined by the boundary is similar to that in the first embodiment.

In this embodiment, as the automatic working system executes the map confirmation procedure, the user may follow the automatic lawn mower to confirm whether the map is accurate. Alternatively, the automatic lawn mower sends an alarm when encountering an exception to prompt the user to confirm whether the map is accurate. This is particularly applicable to a process of confirming whether the working area defined by the boundary is accurate. Due to a working area exception, for example, the automatic lawn mower may have a collision, may be stuck, may slip or may fall off. In this embodiment, the automatic working system includes an alarm unit outputting an alarm signal indicating the working area exception. Specifically, the alarm unit may be a loudspeaker, a display or the like mounted on a housing of the automatic lawn mower or may be a communications module sending a remote alarm signal to a terminal of the user. In this embodiment, the automatic lawn mower further includes an environmental sensor, at least partially mounted at the automatic lawn mower, and configured to detect the working area exception when the automatic lawn mower moves within the working area (including moving along the boundary). The control module monitors an output of the environmental sensor control the alarm unit to output the alarm signal. The environmental sensor includes a camera, a capacitive grassland recognition sensor, an ultrasound sensor, an electro-optical ranging sensor, an accelerometer, the positioning device, or the like. The application of the environmental sensor is similar to that in the first embodiment.

In this embodiment, the map confirmation procedure further includes: receiving a control signal from the user, and providing a drive circuit instruction according to the control signal to control a movement manner. For example, as the automatic working system executes the map confirmation procedure, the automatic lawn mower moves along a boundary and deviates from the actual working area boundary, the map confirmation procedure receives a movement stop signal sent by the user, and providing a drive circuit instruction according to the movement stop signal to control to stop moving. The control module receives a drive circuit instruction and controls the automatic lawn mower to stop moving. The map confirmation procedure is performed under the control of the user, so that the safety of map confirmation is ensured.

In this embodiment, the map confirmation procedure further includes receiving a map modification signal from the user to modify the working area map. When the user determines that the current working area map may be inaccurate and the working area map needs to be modified, the map is corrected. The map is corrected in a manner similar to that in the foregoing embodiments. Details are not described again. The map confirmation procedure receives the map modification signal from the user and use map correction information to correct the stored working area map. Alternatively, the corrected working area map is used to replace the stored working area map. When the confirmation signal from the user is received in the map confirmation procedure, the current working area map is labeled as a formal version (with respect to a modified version) and stored. The automatic working system automatically moves in the working procedure based on the working area map labeled as a formal version, and executes cutting work.

In this embodiment, the automatic working system may receive the confirmation signal from the user by using the communications module. For example, the communications module is configured to communicate with a smart terminal or a remote controller of the user, or receive the confirmation signal from the user by using a local input. The user may use an APP installed on the smart terminal to observe or control the movement of the automatic lawn mower. The APP receives the confirmation signal of the user, and transmits the confirmation signal to the automatic working system.

In this embodiment, the positioning device includes a satellite positioning device that receives satellite positioning data or a beacon positioning device that communicates with a beacon arranged inside/outside a working area to obtain positioning data. The beacon positioning device includes a UWB positioning device or an ultrasound positioning device. The positioning device may be fixedly connected to the automatic lawn mower, or the positioning device is detachably connected to the automatic lawn mower. The satellite positioning device includes a differential satellite positioning device. The differential satellite positioning device includes a real-time kinematic (RTK)-GPS positioning device. The RTK-GPS positioning device uses a carrier phase differential technology and has a structure similar to that of the positioning device in the first embodiment. For a navigation principle of RTK-GPS positioning device, refer to the satellite navigation system in the first embodiment.

Figure 13:
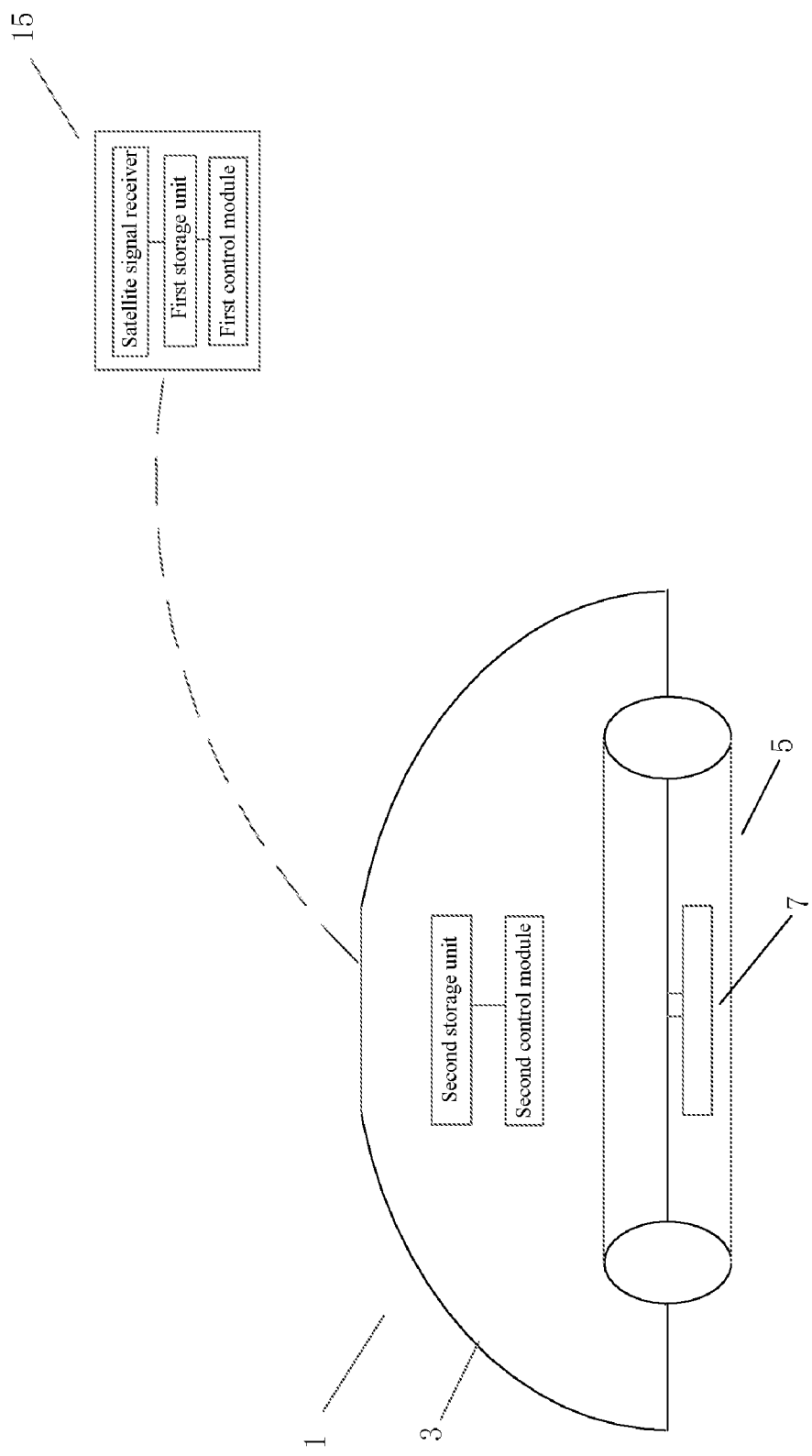
FIG. 13 is a schematic structural diagram of an automatic working system according to a fifth embodiment of the present invention.

In this embodiment, the positioning device is detachably connected to the automatic lawn mower. As the automatic working system executes the map confirmation procedure and the working procedure, the positioning device is mounted at the automatic lawn mower and outputs the current position of the automatic lawn mower. Referring to FIG. 13, in this embodiment, the positioning device includes a housing, a satellite signal receiver mounted at the housing and configured to provide positioning data, a first control module, and a first storage unit. The automatic lawn mower includes a second control module and a second storage unit mounted at the housing of the automatic lawn mower. In this embodiment, the control module of the automatic working system includes the first control module and the second control module. The storage unit includes the first storage unit and the second storage unit. In this embodiment, the working area map, the map confirmation procedure, and the working procedure may be stored in the first storage unit or may be stored in the second storage unit, or are partially stored in the first storage unit and partially stored in the second storage unit. The map confirmation procedure and the working procedure may be executed by the first control module or may be executed by the second control module or are partially executed by the first control module or partially executed by the second control module. In this embodiment, the satellite signal receiver provides positioning data. The first storage unit stores the working area map. The first control module compares the current position of the automatic lawn mower with the working area map and outputs a control instruction to the second control module of the automatic lawn mower. The second control module receives the control instruction output by the first control module and generates a drive signal to control the drive circuit to drive the movement module to enable the automatic lawn mower to move. The first control module receives the confirmation signal from the user, and specifically, receives a user confirmation signal transmitted by an APP. The second control module is further configured to: control the drive circuit to drive the cutting assembly to execute cutting work, collect detection data of the environmental sensor, and control the alarm unit to output the alarm signal.

In this embodiment, the storage unit may be included in the control module or may be independent from the control module.

In this embodiment, the drive circuit includes a first drive circuit, driving the movement module to enable the automatic lawn mower to move. Specifically, the movement module includes a drive motor. The first drive circuit drives the drive motor to enable the drive motor to enable the automatic lawn mower to move. The drive circuit includes a second drive circuit driving the cutting assembly to execute cutting work. Specifically, the cutting assembly includes a cutting motor. The second drive circuit drives the cutting motor to enable the cutting motor to enable a cutter head and a blade to move.

Figure 14:
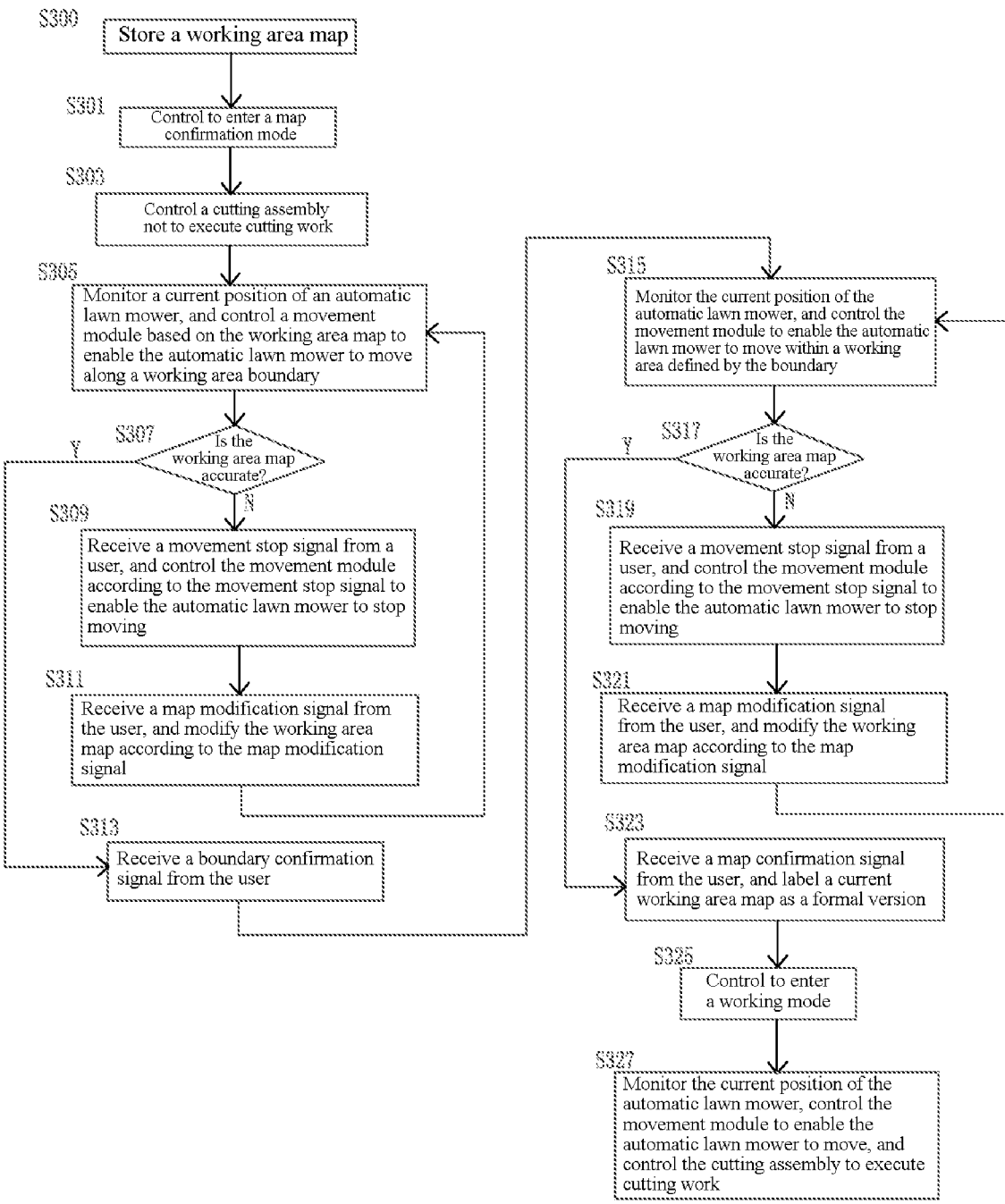
FIG. 14 is a flowchart of a control method of the automatic working system according to the fifth embodiment of the present invention.

FIG. 14 is a flowchart of a control method of an automatic working system corresponding to this embodiment. As shown in FIG. 14, the control method includes the following steps:

S300: Store a working area map.

S301: Control to enter a map confirmation mode.

S303: Control a cutting assembly not to execute cutting work.

S305: Monitor a current position of an automatic lawn mower, and control a movement module based on the working area map to enable the automatic lawn mower to move along a working area boundary.

S307: Determine whether the working area map is accurate, where if the working area map is accurate, the process turns to step S313, or if the working area map is inaccurate, the process turns to step S309.

S309: Receive a movement stop signal from a user, and control the movement module according to the movement stop signal to enable the automatic lawn mower to stop moving.

S311: Receive a map modification signal from the user, and modify the working area map according to the map modification signal.

S313: Receive a boundary confirmation signal from the user.

S315: Monitor the current position of the automatic lawn mower, and control the movement module to enable the automatic lawn mower to move within a working area defined by the boundary.

S317: Determine whether the working area map is accurate, where if the working area map is accurate, the process turns to step S323, or if the working area map is inaccurate, the process turns to step S319.

S319: Receive a movement stop signal from a user, and control the movement module according to the movement stop signal to enable the automatic lawn mower to stop moving.

S321: Receive a map modification signal from the user, and modify the working area map according to the map modification signal.

S323: Receive a map confirmation signal from the user, and label a current working area map as a formal version.

S325: Control to enter a working mode.

S327: Control the movement module to enable the automatic lawn mower to move, and control the cutting assembly to execute cutting work.

In this embodiment, the automatic working system controls to enter the working mode only after the confirmation signal from the user is received, so that the working safety of the automatic working system based on the map is ensured. Certainly, the automatic working system may not enter the working mode after the map confirmation mode. The completion of map confirmation is a necessary condition but not a sufficient condition for entering the working mode.

Figure 5:
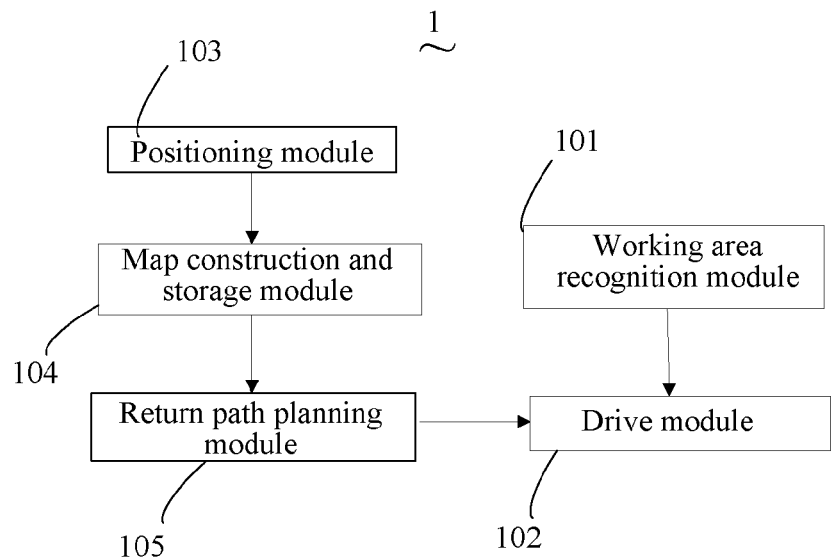
FIG. 5 is a structural block diagram of an automatic lawn mower according to a sixth embodiment of the present invention.

Embodiments of the present invention further provide another embodiment. Referring to FIG. 5, the automatic lawn mower 1 according to a sixth embodiment of the present invention includes a working area recognition module 101, a drive module 102, a positioning module 103, a map construction and storage module 104, and a return path planning module 105. It may be understood that the function of the map construction and storage module 104 may be completed by the storage unit and the control module in the foregoing embodiments.

The working area recognition module 101 is configured to determine whether an area that the automatic lawn mower 1 is about to cover is a working area. For a lawn mower, the working area recognition module 101 includes a grassland detection module used to recognize whether an area that the automatic lawn mower is about to cover is grassland. For example, a camera may be used to photograph an image, and recognize the texture of the photographed image to recognize whether the area is grassland. When the working area recognition module 101 recognizes that an obstacle 9 (for example, a bush) exists in front, the automatic lawn mower 1 steers, reverses or performs another action to avoid the obstacle 9.

The drive module 102 is used to drive the automatic lawn mower 1 to walk within the working area. The drive module 102 includes a power mechanism, a transmission mechanism, a walk mechanism or the like. For the automatic lawn mower, the power mechanism generally includes a motor and a battery pack supplying energy to the motor. The battery pack and the motor are mounted together on the frame of the automatic lawn mower. In this way, the automatic lawn mower does not depend on an external power supply and can better adapt to a cruising requirement within the working area. The transmission mechanism is usually a gear transmission mechanism and used to perform speed-ratio conversion and/or reversing on rotational power output by the motor into and transfers obtained power to the walk mechanism, to drive the automatic lawn mower 1 to walk. A walk assembly of the walk mechanism may be a walking wheel or may be a walking caterpillar track. The walk assembly is usually made of a flexible material or is at least partially made of a flexible material, thereby reducing pressure applied to on grassland.

The positioning module 103 is used to receive a positioning signal to obtain the coordinates of a current position of the automatic lawn mower or a coordinate area formed of a plurality of coordinates.

The map construction and storage module 104 is configured to: determine whether the obtained coordinates are stored on a working map, and when it is determined that the coordinates are not stored, add the coordinates to the working map to obtain an updated working map.

As the automatic lawn mower 1 walks, after the positioning module 103 obtains coordinates of positions on a walking path or a plurality of coordinates, the map construction and storage module 104 determines whether these coordinates are already stored on the working map. If these coordinates are already stored, it indicates that the current position of the automatic lawn mower 1 is in a charted working area. If these coordinates are not stored, it indicates that the current position of the automatic lawn mower 1 is in an uncharted working area. Such an area needs to be added to the working map to improve the working map, thereby facilitating subsequent grass cutting work and a subsequent return.

The positioning module 103 has a communications module used to receive the positioning signal, and the communications module includes one or more of a GPS module, a DGPS module, a UWB module, a Zigbee module, a Wi-Fi module, an ultrasound receiving module, an inertial navigation module, an odometer, an electronic map, and an acceleration sensor. In other words, a plurality of positioning manners may be used, provided that the coordinates of the positions covered by the automatic lawn mower 1 can be obtained.

The coordinates may be coordinate values that are allocated by a satellite positioning system and represent the position of an object on the Earth or may further be coordinate values in a self-constructed coordinate system. In this case, the origin of the coordinate system of the coordinates may be set as required. For example, the automatic lawn mower 1 usually starts from the charging station 2, executes grass cutting work, and returns to the charging station when the automatic lawn mower 1 needs to be charged. Therefore, the origin of the coordinate system may be the charging station 2.

The automatic lawn mower 1 uses the working area recognition module 101 to recognize an uncharted working area. In this way, the automatic lawn mower 1 does not need to chart all working areas during working. In other words, the working map does not need to be completely improved. The automatic lawn mower 1 can work in an uncharted working area. The automatic lawn mower 1 can start rapidly to work without learning about all working areas first, particularly, when the automatic lawn mower 1 is moved to work in a new working area.

In addition, because the positioning module 103 and the map construction and storage module 104 are arranged, the automatic lawn mower 1 can update the working map after working (that is, grass cutting work) each time, so that the working map is continuously improved. In this way, when the automatic lawn mower 1 needs to return after grass cutting work is finished each time, the automatic lawn mower 1 may design a return path based on the updated known working map.

The return path planning module 105 is configured to: receive a return instruction, generate a return path according to the updated working map, and control the automatic lawn mower 1 to return from a position before returning to a predetermined position along the return path.

The automatic lawn mower 1 usually returns to the charging station 2 to be charged. Therefore, the predetermined position is usually a charging station. However, the predetermined position may be another required position. For example, the predetermined position may be an area that requires intensive grass cutting. For another example, the predetermined position may be a position where a user can conveniently examine and maintain the automatic lawn mower 1.

It has been described above that the automatic lawn mower 1 can update a known working map in each walk. When making a return, the automatic lawn mower 1 may plan a return path based on the updated known map. The automatic lawn mower 1 plans a path based on the known map and makes a fast return, and the user does not need to train the lawn mower to learn about all working areas. The return path planning module 105 generates optimal return paths based on the known map. The optimal return paths are paths that satisfy different objectives and requirements.

For example, the return path is the shortest path that is from the position before returning to the predetermined position and is defined by known coordinates on the working map. The shortest path may be a straight line or may be a broken line or a curve after an obstacle is avoided.

For another example, the return path planning module 105 is further configured to record the numbers of times that known coordinates on the working map have been covered by the automatic lawn mower 1. The return path is determined by the position coordinates before returning, the coordinates of the predetermined position, and known coordinates that have been least often covered by the automatic lawn mower 1 between the position before returning and the predetermined position. In this way, when returning, the automatic lawn mower 1 can be prevented from crushing some areas.

A working process of the automatic lawn mower 1 is briefly described below with reference to FIG. 6 to FIG. 10.

Figure 6:
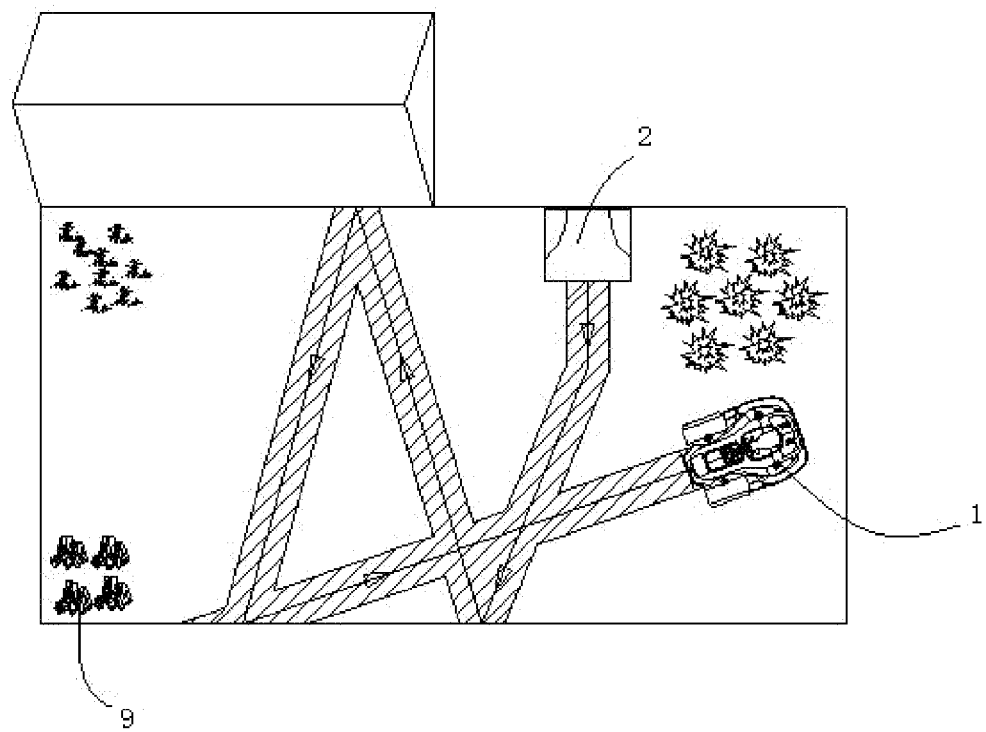
FIG. 6 is a schematic diagram of constructing a working map when the automatic lawn mower works for the first time.

Referring to FIG. 6, the automatic lawn mower 1 starts from the charging station 2 to work for the first time. The arrow schematically shows a walking path of the automatic lawn mower 1. In this process, no coordinate has been recorded on the working map yet. The coordinates of positions covered by the automatic lawn mower 1 are all recorded to construct an initial working map.

Figure 7:
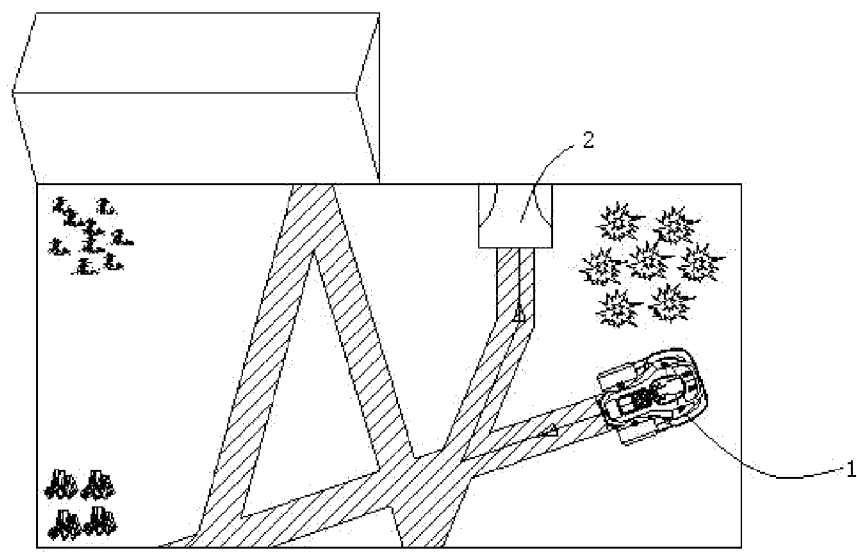
FIG. 7 is a schematic diagram showing that the automatic lawn mower returns based on the working map constructed in FIG. 6.

Referring to FIG. 7, the automatic lawn mower 1 finishes working for the first time and start from the position in FIG. 7 to return to the charging station 2. In this case, the return path planning module 105 generates a broken line path shown by the arrow in the figure.

The automatic lawn mower 1 does not need to return along an original path, and can implement a fast return according to the broken line path in FIG. 7.

Figure 8:
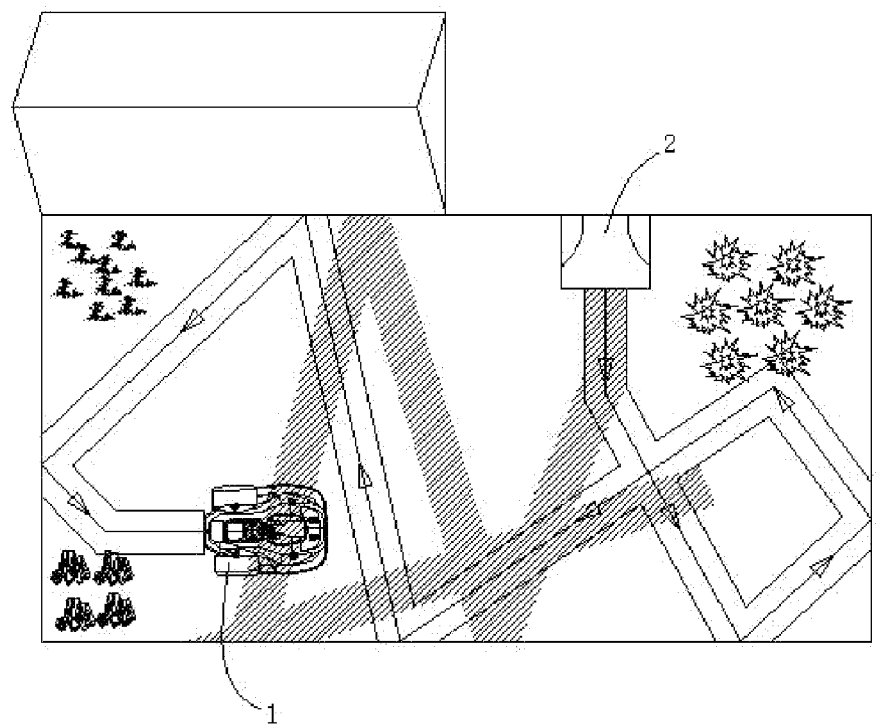
FIG. 8 is a schematic diagram of constructing a working map when the automatic lawn mower works for the second time.

Referring to FIG. 8, the automatic lawn mower 1 starts from the charging station 2 to work for the second time. The section lines schematically show the area covered during the first-time work. An area defined by solid-line boundaries is an area covered during the second-time work. In this process, the area covered by the automatic lawn mower 1 partially overlaps the area covered during the first-time work. Coordinates corresponding to these overlapping areas do not need to be repeatedly recorded. The map construction and storage module 104 only records new coordinates, so that an updated map includes the new area covered during the second-time work.

Figure 9:
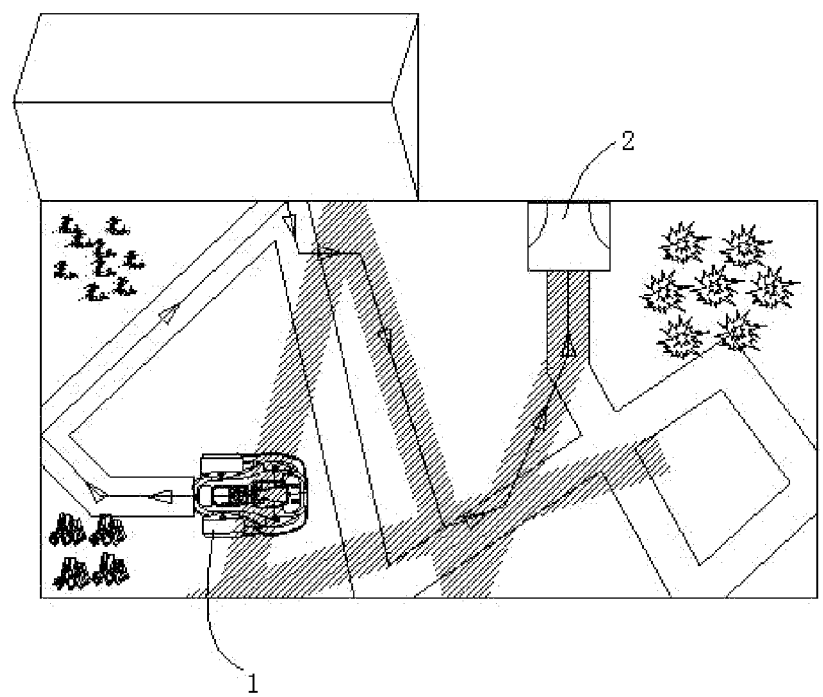
FIG. 9 is a schematic diagram showing that the automatic lawn mower returns based on an updated working map in FIG. 7.

Referring to FIG. 9, after finishing working for the second time, the automatic lawn mower 1 starts from the position in FIG. 9 to make a return. The return path generated by the return path planning module 105 is shown by the arrow in FIG. 9. It may be seen that the return path planning module 105 does not use an original movement path during the second-time work or the first-time work, but instead uses both the area charted during the first-time work and the area charted during the second-time work to generate a relatively convenient return path.

Figure 10:
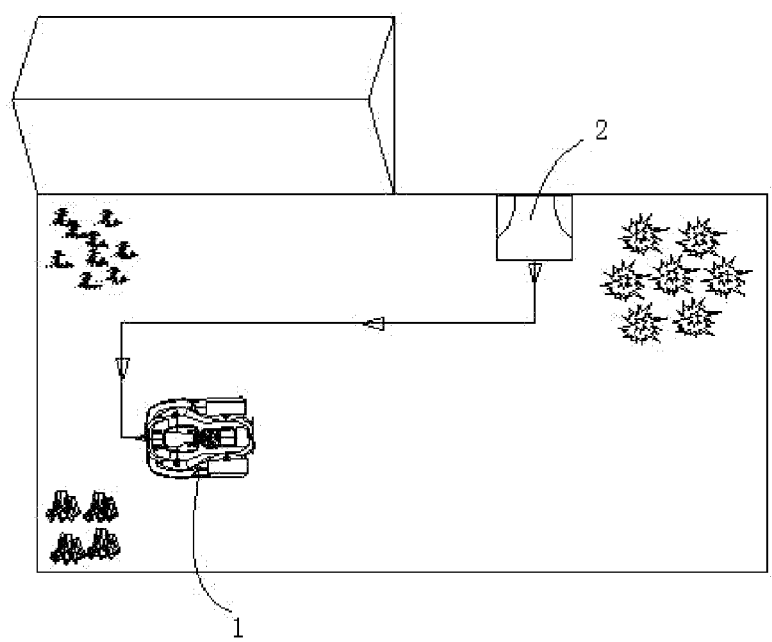
FIG. 10 is a schematic diagram of constructing a working map when the automatic lawn mower works for the $N^{th}$ time.
Figure 11:
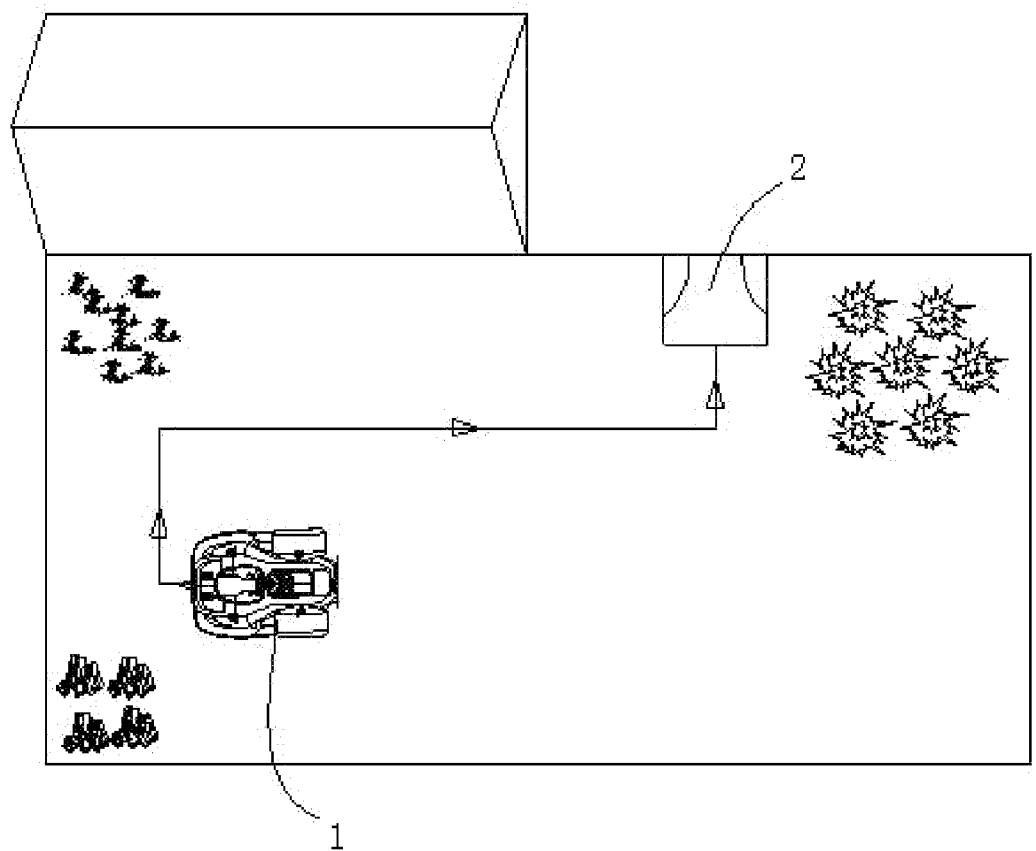
FIG. 11 is a schematic diagram showing that the automatic lawn mower returns based on an updated working map in FIG. 10.

Referring to FIG. 10 and FIG. 11, the automatic lawn mower 1 continues to work, new coordinates keep being added to the working map, and the working map keeps being improved. FIG. 10 and FIG. 11 schematically show that all working areas have been charted. Each time the return path planning module 105 can generate an optimized return path according to a new working map.

The automatic lawn mower 1 can start rapidly to work and improve a working map during working. After finishing work, the automatic lawn mower 1 can navigate according to an existing working map to implement a fast return. A user does not need to train the automatic lawn mower 1 in advance to learn about all working areas.

Figure 12:
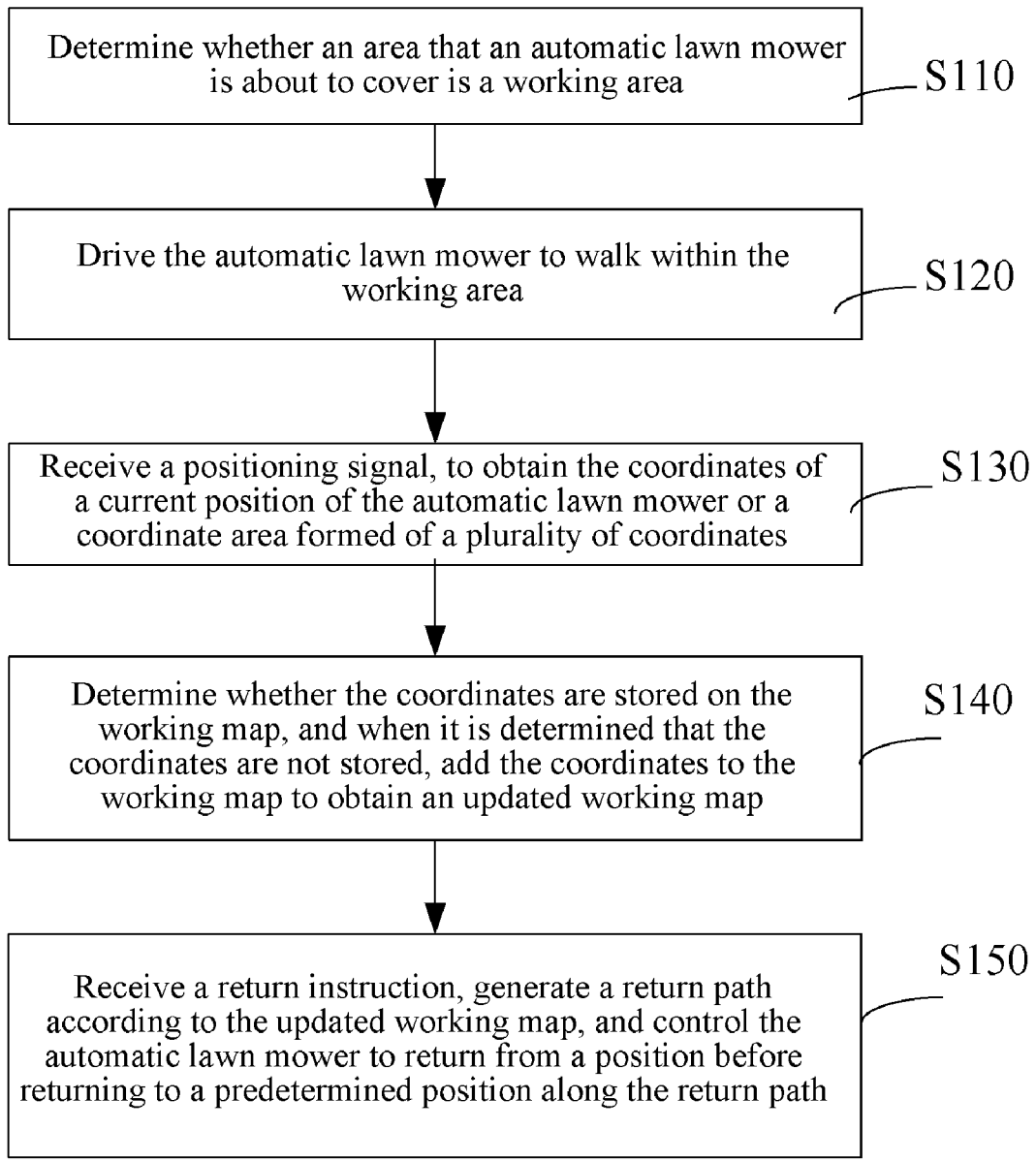
FIG. 12 is a flowchart of a walking method of an automatic lawn mower according to an embodiment.

Referring to FIG. 12, an embodiment of the present invention further provides a walking method of an automatic lawn mower 1, including the following steps:

S110: Determine whether an area that an automatic lawn mower is about to cover is a working area. When working, the automatic lawn mower 1 uses the working area recognition module 101 to chart an area to be covered but does not depend on whether a working map is complete. A user does not need to train the lawn mower in advance, so that it is more convenient to use the lawn mower.

S120: Drive the automatic lawn mower to walk within the working area. The power mechanism drives the walk mechanism to enable the automatic lawn mower to move forward. Moreover, the automatic lawn mower can automatically avoid an obstacle and only walk within the working area.

S130: Receive a positioning signal, to obtain the coordinates of a current position of the automatic lawn mower or a coordinate area formed of a plurality of coordinates. Manners such as the GPS and DGPS are used to implement positioning to obtain coordinates of positions in a walking path.

S140: Determine whether the coordinates are stored on the working map, and when it is determined that the coordinates are not stored, add the coordinates to the working map to obtain an updated working map. The map construction and storage module 104 uses the walk of the automatic lawn mower 1 during working each time to keep improving the working map.

S150: Receive a return instruction, generate a return path according to the updated working map, and control the automatic lawn mower to return from a position before returning to a predetermined position along the return path. Each time the work ends, the automatic lawn mower 1 needs to return from the position before returning to the predetermined position. In this case, the return path planning module 105 uses a known working map to perform navigation to generate an optimized return path.

For example, the return path is the shortest path that is from the position before returning to the predetermined position and is defined by known coordinates on the working map. The shortest path may be a straight line or may be a broken line or curve after an obstacle is avoided.

For another example, the return path planning module 105 is further configured to record the numbers of times that known coordinates on the working map have been covered by the automatic lawn mower 1. The return path is determined by the position coordinates before returning, the coordinates of the predetermined position, and known coordinates that have been least often covered by the automatic lawn mower 1 between the position before returning and the predetermined position. In this way, when returning, the automatic lawn mower 1 can be prevented from crushing some areas.

By using the foregoing method, the automatic lawn mower 1 can start rapidly to work and improve a working map during working. After finishing work, the automatic lawn mower 1 can navigate according to an existing working map to implement a fast return. A user does not need to train the automatic lawn mower 1 in advance to learn about all working areas.

The present invention is not limited to the structures in the specific embodiments, and any structure and method obtained based on the concept of the present invention fall within the protection scope of the present invention.

What is claimed is:

1. An automatic working system, comprising a self-moving device and a positioning device, wherein
the self-moving device comprises a movement module, a task execution module, and a drive circuit connected to the movement module and the task execution module, and the drive circuit is configured to drive the movement module to enable the self-moving device to move, and to drive the task execution module to execute a working task;
the positioning device is configured to detect a current position of the self-moving device; and
the automatic working system comprises:
a storage unit, configured to store:
a working area map,
a map confirmation procedure, the map confirmation procedure comprising:
controlling the self-moving device to move along the working area boundary based on the working area map, and
receiving a confirmation signal from a user to complete the map confirmation procedure;
wherein the map confirmation procedure keeps a cutting assembly of the self-moving device from operating, and
a working procedure, the working procedure comprising:
controlling the self-moving device to move within the working area defined by the working area map and to execute the working task; and
a control module, configured to monitor an output of the positioning device to execute the map confirmation procedure and execute the working procedure after the map confirmation procedure is completed.

2. The automatic working system according to claim 1, wherein the positioning device is fixedly connected to the self-moving device.

3. The automatic working system according to claim 1, wherein the map confirmation procedure further comprises:
providing a drive circuit instruction to keep the task execution module from executing the working task.

4. The automatic working system according to claim 3, wherein the task execution module comprises the cutting assembly, and the map confirmation procedure comprises providing a drive circuit instruction to keep the cutting assembly from executing cutting work.

5. The automatic working system according to claim 1, wherein the map confirmation procedure further comprises:
after controlling the self-moving device to move along the working area boundary, controlling the self-moving device to move within a working area defined by the boundary.

6. The automatic working system according to claim 1, wherein the automatic working system comprises an alarm unit, configured to output an alarm signal indicating a working area exception.

7. The automatic working system according to claim 6, wherein the automatic working system comprises an environmental sensor, at least partially mounted at the self-moving device, and configured to detect the working area exception when the self-moving device moves within the working area; and the control module monitors an output of the environmental sensor and control the alarm unit to output the alarm signal.

8. The automatic working system according to claim 1, wherein the map confirmation procedure further comprises:
receiving a control signal from the user, and providing a drive circuit instruction according to the control signal to control a movement manner.

9. The automatic working system according to claim 8, wherein the control signal comprises a movement stop signal, the map confirmation procedure comprises:
receiving the movement stop signal from the user, and controlling the self-moving device to stop based on the movement stop signal.

10. The automatic working system according to claim 1, wherein the map confirmation procedure further comprises receiving a map modification signal from the user to modify the working area map.

11. The automatic working system according to claim 1, comprising a communications module, communicating with a smart terminal of the user, and configured to receive the confirmation signal from the user.

12. The automatic working system according to claim 1, wherein the positioning device is detachably connected to the self-moving device.

13. A control method of an automatic working system, the automatic working system comprising a self-moving device and a positioning device, wherein
the self-moving device comprises a movement module and a task execution module;
the positioning device is configured to detect a current position of the self-moving device; and
the control method comprises the following steps:
storing a working area map;
controlling to enter a map confirmation mode, and in the map confirmation mode:
keeping a cutting assembly of the self-moving device from operating, monitoring the current position of the self-moving device, controlling the movement module based on the working area map to enable the self-moving device to move along a working area boundary; and receiving a confirmation signal from a user; and only after the confirmation signal from the user is received, controlling to enter a working mode; and in the working mode, monitoring the current position of the self-moving device, controlling the movement module to enable the self-moving device to move within a working area defined by the map, and controlling the task execution module to execute a working task.

14. The control method according to claim 13, wherein in the map confirmation mode, the task execution module is controlled not to execute the working task.

15. The control method according to claim 14, wherein the task execution module comprises the cutting assembly.

16. The control method according to claim 13, wherein in the map confirmation mode, after the movement module is controlled based on the working area map to enable the self-moving device to move along a working area boundary, the control method further comprises the following step:

controlling the movement module to enable the self-moving device to move within a working area defined by the boundary.

17. The control method according to claim 13, wherein in the map confirmation mode, a control signal from the user is received, and the movement module is controlled according to the control signal to enable the self-moving device to change a movement manner.

18. The control method according to claim 17, wherein the control signal comprises a movement stop signal, and the movement module is controlled according to the movement stop signal to enable the self-moving device to stop moving.

19. The control method according to claim 13, wherein a communications module is provided, and the communications module communicates with a smart terminal of the user, and is configured to receive the confirmation signal from the user.

20. The control method according to claim 13 wherein the map stored in the storage unit is generated by a smart terminal operated by the user.

* * * * *